(12) United States Patent
Ahn

(10) Patent No.: US 10,630,809 B2
(45) Date of Patent: Apr. 21, 2020

(54) INFORMATION PROCESSING APPARATUS, IMAGE PROCESSING APPARATUS AND CONTROL METHODS THEREOF

(71) Applicant: SAMSUNG ELECTRONICS CO., LTD., Suwon-si, Gyeonggi-do (KR)

(72) Inventor: Young-joon Ahn, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 203 days.

(21) Appl. No.: 15/196,385

(22) Filed: Jun. 29, 2016

(65) Prior Publication Data

US 2017/0026493 A1    Jan. 26, 2017

(30) Foreign Application Priority Data

Jul. 20, 2015    (KR) .......................... 10-2015-0102365

(51) Int. Cl.
    *H04L 29/08*    (2006.01)
(52) U.S. Cl.
    CPC ............ *H04L 67/34* (2013.01); *H04L 67/02* (2013.01); *H04L 67/2804* (2013.01)
(58) Field of Classification Search
    CPC ........................................... H04L 67/34
    USPC ........................................ 709/226
    See application file for complete search history.

(56) References Cited

U.S. PATENT DOCUMENTS

| | | | |
|---|---|---|---|
| 5,845,090 A | 12/1998 | Collins, III et al. | |
| 6,138,153 A | 10/2000 | Collins, III et al. | |
| 6,335,927 B1* | 1/2002 | Elliott | H04L 12/14 370/352 |
| 6,606,660 B1* | 8/2003 | Bowman-Amuah | H04L 65/602 709/227 |
| 6,978,422 B1* | 12/2005 | Bushe | G06F 9/451 715/734 |
| 7,356,679 B1* | 4/2008 | Le | G06F 9/45558 713/1 |
| 7,506,335 B1 | 3/2009 | Wooff et al. | |
| 7,640,582 B2* | 12/2009 | Beck | H04L 63/12 707/999.001 |

(Continued)

FOREIGN PATENT DOCUMENTS

KR    10-2015-0025287    3/2015

OTHER PUBLICATIONS

Microsoft Computer Dictionary, "optimization", "optimize", 5th edition, 2002, p. 380.*

*Primary Examiner* — Ondrej C Vostal
(74) *Attorney, Agent, or Firm* — Nixon & Vanderhye P.C.

(57) ABSTRACT

An information processing apparatus including: a storage configured to store a main program of an application to be installed in an application execution apparatus and first resource data including data corresponding to a plurality of attributes about execution of the main program; and at least one processor configured to create second resource data excluding data corresponding to at least one attribute from the plurality of attributes of the first resource data, the at least one attribute being used less than another attribute when the main program is executed, the second resource data having a smaller data size than the first resource data, and to produce a package program including the main program and the created second resource data for installing the application.

18 Claims, 28 Drawing Sheets

(56) References Cited

U.S. PATENT DOCUMENTS

| | | | |
|---|---|---|---|
| 7,680,801 B2 * | 3/2010 | Blumenau | G06F 17/30085 705/51 |
| 7,917,584 B2 * | 3/2011 | Arthursson | G06F 3/0486 709/205 |
| 8,136,100 B1 | 3/2012 | Goldman | |
| 8,255,932 B1 * | 8/2012 | Clemm | G06F 8/54 709/230 |
| 8,285,808 B1 * | 10/2012 | Joel | G06F 17/30905 345/473 |
| 8,505,069 B1 * | 8/2013 | Solodovnikov | G06F 8/65 709/224 |
| 8,819,772 B2 * | 8/2014 | Bettini | H04L 63/0245 709/219 |
| 8,838,784 B1 | 9/2014 | Kalavade | |
| 8,924,957 B1 | 12/2014 | Newstadt et al. | |
| 9,455,976 B2 * | 9/2016 | Milman | H04L 67/10 |
| 10,116,732 B1 * | 10/2018 | Canton | H04L 41/0813 |
| 2001/0049691 A1 * | 12/2001 | Asazu | G06F 17/30017 |
| 2002/0069175 A1 | 6/2002 | Burich | |
| 2003/0005427 A1 | 1/2003 | Herrero | |
| 2003/0028869 A1 | 2/2003 | Drake et al. | |
| 2003/0140044 A1 | 7/2003 | Mok et al. | |
| 2003/0159137 A1 | 8/2003 | Drake et al. | |
| 2003/0181196 A1 | 9/2003 | Davidov et al. | |
| 2004/0034795 A1 * | 2/2004 | Anderson | G06F 11/328 709/213 |
| 2004/0205782 A1 | 10/2004 | Alcazar et al. | |
| 2005/0055692 A1 | 3/2005 | Lupini et al. | |
| 2005/0066015 A1 | 3/2005 | Dandekar et al. | |
| 2005/0125524 A1 | 6/2005 | Chandrasekhar et al. | |
| 2005/0149991 A1 * | 7/2005 | Hallberg | H04N 21/478 725/139 |
| 2005/0197996 A1 | 9/2005 | Cobb et al. | |
| 2005/0278535 A1 | 12/2005 | Fortune et al. | |
| 2005/0289264 A1 | 12/2005 | Illowsky et al. | |
| 2005/0289265 A1 | 12/2005 | Illowsky et al. | |
| 2005/0289508 A1 | 12/2005 | Illowsky et al. | |
| 2005/0289509 A1 | 12/2005 | Illowsky et al. | |
| 2005/0289527 A1 | 12/2005 | Illowsky et al. | |
| 2005/0289531 A1 | 12/2005 | Illowsky et al. | |
| 2005/0289558 A1 | 12/2005 | Illowsky et al. | |
| 2006/0005193 A1 | 1/2006 | Illowsky et al. | |
| 2006/0005205 A1 | 1/2006 | Illowsky et al. | |
| 2006/0005249 A1 | 1/2006 | Wu et al. | |
| 2006/0005251 A1 | 1/2006 | Wu et al. | |
| 2006/0015527 A1 * | 1/2006 | Dingle | G06F 9/4856 |
| 2006/0015665 A1 | 1/2006 | Illowsky et al. | |
| 2006/0015936 A1 | 1/2006 | Illowsky et al. | |
| 2006/0015937 A1 | 1/2006 | Illowsky et al. | |
| 2006/0020912 A1 | 1/2006 | Illowsky et al. | |
| 2006/0026305 A1 | 2/2006 | Illowsky et al. | |
| 2006/0041509 A1 | 2/2006 | Koerber | |
| 2006/0123414 A1 | 6/2006 | Fors et al. | |
| 2006/0143362 A1 | 6/2006 | Li et al. | |
| 2006/0188229 A1 * | 8/2006 | Yamagata | G11B 27/105 386/244 |
| 2006/0200814 A1 | 9/2006 | Kontinen et al. | |
| 2006/0206882 A1 | 9/2006 | Illowsky et al. | |
| 2006/0259904 A1 | 11/2006 | Celli et al. | |
| 2006/0265702 A1 | 11/2006 | Isaacson et al. | |
| 2006/0277272 A1 * | 12/2006 | Cantalini | H04N 5/782 709/217 |
| 2006/0277542 A1 | 12/2006 | Wipfel | |
| 2006/0282440 A1 | 12/2006 | Fletcher et al. | |
| 2007/0150478 A1 * | 6/2007 | Cho | H04L 29/12113 |
| 2007/0260476 A1 * | 11/2007 | Smolen | G06F 16/2308 705/1.1 |
| 2008/0028390 A1 | 1/2008 | Fors et al. | |
| 2008/0127179 A1 | 5/2008 | Moss et al. | |
| 2008/0134169 A1 | 6/2008 | Williams et al. | |
| 2008/0228889 A1 | 9/2008 | Secomandi et al. | |
| 2008/0256532 A1 | 10/2008 | Xie et al. | |
| 2008/0288939 A1 | 11/2008 | DeHaan | |
| 2009/0030924 A1 * | 1/2009 | Benitez | H04N 21/235 |
| 2009/0089779 A1 | 4/2009 | Brengle et al. | |
| 2009/0129738 A1 * | 5/2009 | Morimoto | G11B 27/034 386/248 |
| 2009/0150881 A1 | 6/2009 | Lupini et al. | |
| 2009/0249329 A1 | 10/2009 | Dash | |
| 2009/0254723 A1 | 10/2009 | Li et al. | |
| 2009/0254890 A1 | 10/2009 | Kang et al. | |
| 2010/0042991 A1 | 2/2010 | Xu et al. | |
| 2010/0070264 A1 | 3/2010 | Lee | |
| 2010/0088274 A1 * | 4/2010 | Ahmed | G06F 16/275 707/610 |
| 2010/0094658 A1 | 4/2010 | Mok et al. | |
| 2010/0107153 A1 | 4/2010 | Kwon | |
| 2010/0131659 A1 * | 5/2010 | Narayana | H04L 65/1083 709/228 |
| 2010/0146085 A1 * | 6/2010 | Van Wie | H04L 12/00 709/220 |
| 2010/0198982 A1 * | 8/2010 | Fernandez | G06Q 30/02 709/231 |
| 2010/0211943 A1 | 8/2010 | Chu et al. | |
| 2010/0275018 A1 | 10/2010 | Pedersen | |
| 2010/0312805 A1 * | 12/2010 | Noonan | G06F 8/63 707/822 |
| 2010/0312817 A1 | 12/2010 | Steakley | |
| 2011/0010699 A1 * | 1/2011 | Cooper | G06F 21/12 717/169 |
| 2011/0047594 A1 * | 2/2011 | Mahaffey | G06F 21/564 726/1 |
| 2011/0047597 A1 * | 2/2011 | Mahaffey | G06F 21/564 726/3 |
| 2011/0061048 A1 | 3/2011 | Katoh | |
| 2011/0156880 A1 | 6/2011 | Rygaard et al. | |
| 2011/0161912 A1 | 6/2011 | Eteminan et al. | |
| 2011/0175923 A1 | 7/2011 | Mahajan et al. | |
| 2011/0258286 A1 | 10/2011 | Li et al. | |
| 2011/0265164 A1 * | 10/2011 | Lucovsky | G06F 9/45533 726/7 |
| 2011/0289498 A1 | 11/2011 | Xie et al. | |
| 2011/0295944 A1 | 12/2011 | Buonomo et al. | |
| 2012/0060149 A1 | 3/2012 | Kimura | |
| 2012/0066669 A1 * | 3/2012 | Bouzakis | G06F 8/658 717/168 |
| 2012/0072596 A1 * | 3/2012 | Kruse | G06F 21/6227 709/226 |
| 2012/0089669 A1 | 4/2012 | Berg et al. | |
| 2012/0124178 A1 * | 5/2012 | Sparks | H04L 67/06 709/219 |
| 2012/0137282 A1 | 5/2012 | Illowsky et al. | |
| 2012/0159310 A1 | 6/2012 | Chang et al. | |
| 2012/0179703 A1 * | 7/2012 | Ajitomi | G06F 16/24 707/765 |
| 2012/0197765 A1 | 8/2012 | Kim et al. | |
| 2012/0221384 A1 | 8/2012 | Avadhanam et al. | |
| 2012/0303168 A1 | 11/2012 | Halahan et al. | |
| 2013/0013677 A1 | 1/2013 | Engstrom et al. | |
| 2013/0124619 A1 | 5/2013 | Steakley | |
| 2013/0124807 A1 * | 5/2013 | Nielsen | G06F 11/1438 711/162 |
| 2013/0139148 A1 | 5/2013 | Berg et al. | |
| 2013/0165238 A1 | 6/2013 | Batista Jerez | |
| 2013/0167136 A1 | 6/2013 | Goldman | |
| 2013/0223819 A1 | 8/2013 | Sims et al. | |
| 2013/0247005 A1 | 9/2013 | Hirsch et al. | |
| 2013/0274933 A1 | 10/2013 | Kelly et al. | |
| 2013/0275116 A1 | 10/2013 | Garvin, Jr. et al. | |
| 2013/0275623 A1 | 10/2013 | Stoilov et al. | |
| 2013/0283229 A1 | 10/2013 | Hsu | |
| 2013/0305218 A1 | 11/2013 | Hirsch et al. | |
| 2013/0317956 A1 | 11/2013 | Droege et al. | |
| 2013/0332900 A1 | 12/2013 | Berg et al. | |
| 2013/0339922 A1 * | 12/2013 | Sproule | G06Q 10/063 717/103 |
| 2013/0339946 A1 | 12/2013 | Meredith et al. | |
| 2014/0007075 A1 * | 1/2014 | Sporkert | G06F 8/68 717/173 |
| 2014/0007079 A1 | 1/2014 | Whitney et al. | |
| 2014/0033055 A1 | 1/2014 | Gardner et al. | |
| 2014/0044246 A1 | 2/2014 | Klemm et al. | |

(56) References Cited

U.S. PATENT DOCUMENTS

| | | | |
|---|---|---|---|
| 2014/0047413 A1* | 2/2014 | Sheive | H04L 65/403 717/110 |
| 2014/0052828 A1* | 2/2014 | Mousseau | H04L 65/605 709/219 |
| 2014/0073357 A1* | 3/2014 | Johnson | H04W 4/025 455/456.3 |
| 2014/0074769 A1* | 3/2014 | Cushing | G06F 16/2228 707/600 |
| 2014/0080560 A1 | 3/2014 | Knutsson | |
| 2014/0106876 A1 | 4/2014 | Knutsson et al. | |
| 2014/0108140 A1 | 4/2014 | Crawford | |
| 2014/0108537 A1 | 4/2014 | Crawford | |
| 2014/0108547 A1 | 4/2014 | Rao | |
| 2014/0109041 A1 | 4/2014 | Yunten | |
| 2014/0109046 A1 | 4/2014 | Hirsch et al. | |
| 2014/0109077 A1* | 4/2014 | Ashar | G06F 9/44 717/171 |
| 2014/0135104 A1 | 5/2014 | Knutsson | |
| 2014/0149492 A1* | 5/2014 | Ananthanarayanan | H04L 67/42 709/203 |
| 2014/0149591 A1* | 5/2014 | Bhattacharya | H04L 67/1097 709/226 |
| 2014/0164595 A1* | 6/2014 | Bray | H04L 63/02 709/224 |
| 2014/0171022 A1 | 6/2014 | Kiene et al. | |
| 2014/0173683 A1* | 6/2014 | Zhang | G06F 21/31 726/1 |
| 2014/0207546 A1 | 7/2014 | Nanez | |
| 2014/0207603 A1 | 7/2014 | Orenstein et al. | |
| 2014/0244365 A1 | 8/2014 | Price et al. | |
| 2014/0278850 A1 | 9/2014 | Boccuzzi, Jr. et al. | |
| 2014/0280723 A1 | 9/2014 | Gokul | |
| 2014/0289368 A1* | 9/2014 | Benitez | H04L 67/06 709/219 |
| 2014/0297430 A1 | 10/2014 | Rezvani et al. | |
| 2014/0297437 A1 | 10/2014 | Natarajan | |
| 2014/0304186 A1 | 10/2014 | Brown | |
| 2014/0317293 A1 | 10/2014 | Shatzkamer | |
| 2014/0317448 A1 | 10/2014 | Rash et al. | |
| 2014/0337144 A1 | 11/2014 | Seymour | |
| 2014/0344334 A1 | 11/2014 | Trachtenberg et al. | |
| 2014/0359408 A1 | 12/2014 | Rosenberg | |
| 2014/0359552 A1 | 12/2014 | Misra et al. | |
| 2014/0365300 A1 | 12/2014 | Scaturro | |
| 2014/0379902 A1 | 12/2014 | Wan et al. | |
| 2015/0026072 A1 | 1/2015 | Zhou et al. | |
| 2015/0032553 A1 | 1/2015 | Thaler et al. | |
| 2015/0033305 A1* | 1/2015 | Shear | G06F 21/45 726/6 |
| 2015/0058355 A1 | 2/2015 | Naqvi | |
| 2015/0072791 A1 | 3/2015 | Batista Jerez | |
| 2015/0205834 A1* | 7/2015 | Keeton | G06F 16/14 707/714 |
| 2015/0220492 A1* | 8/2015 | Simeonov | G06F 16/972 715/235 |
| 2015/0220825 A1* | 8/2015 | Oikawa | H04N 1/32448 358/1.13 |
| 2015/0339370 A1* | 11/2015 | Onusko | G06F 17/30595 707/722 |
| 2016/0036872 A1* | 2/2016 | Lappin | H04L 65/403 709/204 |
| 2016/0103586 A1* | 4/2016 | Greenberg | G06Q 30/06 715/739 |
| 2016/0103719 A1* | 4/2016 | Tamilmani | G06F 11/3696 709/203 |
| 2016/0104205 A1* | 4/2016 | Greenberg | G06F 8/38 705/14.68 |
| 2016/0132214 A1* | 5/2016 | Koushik | G06F 3/04842 715/741 |
| 2016/0344811 A1* | 11/2016 | Fawcett | H04L 67/18 |
| 2016/0360382 A1* | 12/2016 | Gross | G06F 3/0488 |
| 2017/0063833 A1* | 3/2017 | Colle | H04L 63/083 |
| 2017/0068810 A1* | 3/2017 | Yao | G06F 21/57 |
| 2017/0078384 A1* | 3/2017 | Trandafir | G06F 16/178 |
| 2017/0206071 A1* | 7/2017 | Kirkpatrick | G06F 8/61 |
| 2017/0286644 A1* | 10/2017 | Dong | G06F 21/60 |
| 2017/0351862 A1* | 12/2017 | Mohinder | G06F 21/57 |
| 2017/0357818 A1* | 12/2017 | Sheehan | G06F 21/604 |

* cited by examiner

FIG. 10

| TYPE | < PNG > |
|---|---|
| RETAINED | IHDR, sBIT, pHYs, IDAT, IEND |
| MOVED TO RESOURCE INFORMATION | tEXt |
| DELETED | prVW, mkBF, mkTS, mkBS, mkBT, iTXt |

730

<JPEG>

| RESOURCE TYPE | FORMAT | FORMAT FOR CONVERSION |
|---|---|---|
| VIDEO | PNG | WEBP |
| VIDEO | JPEG | WEBP |
| MOVING IMAGE | H264 | VP8 |
| AUDIO | FLAC | OGG |
| ⋮ | ⋮ | ⋮ |

860

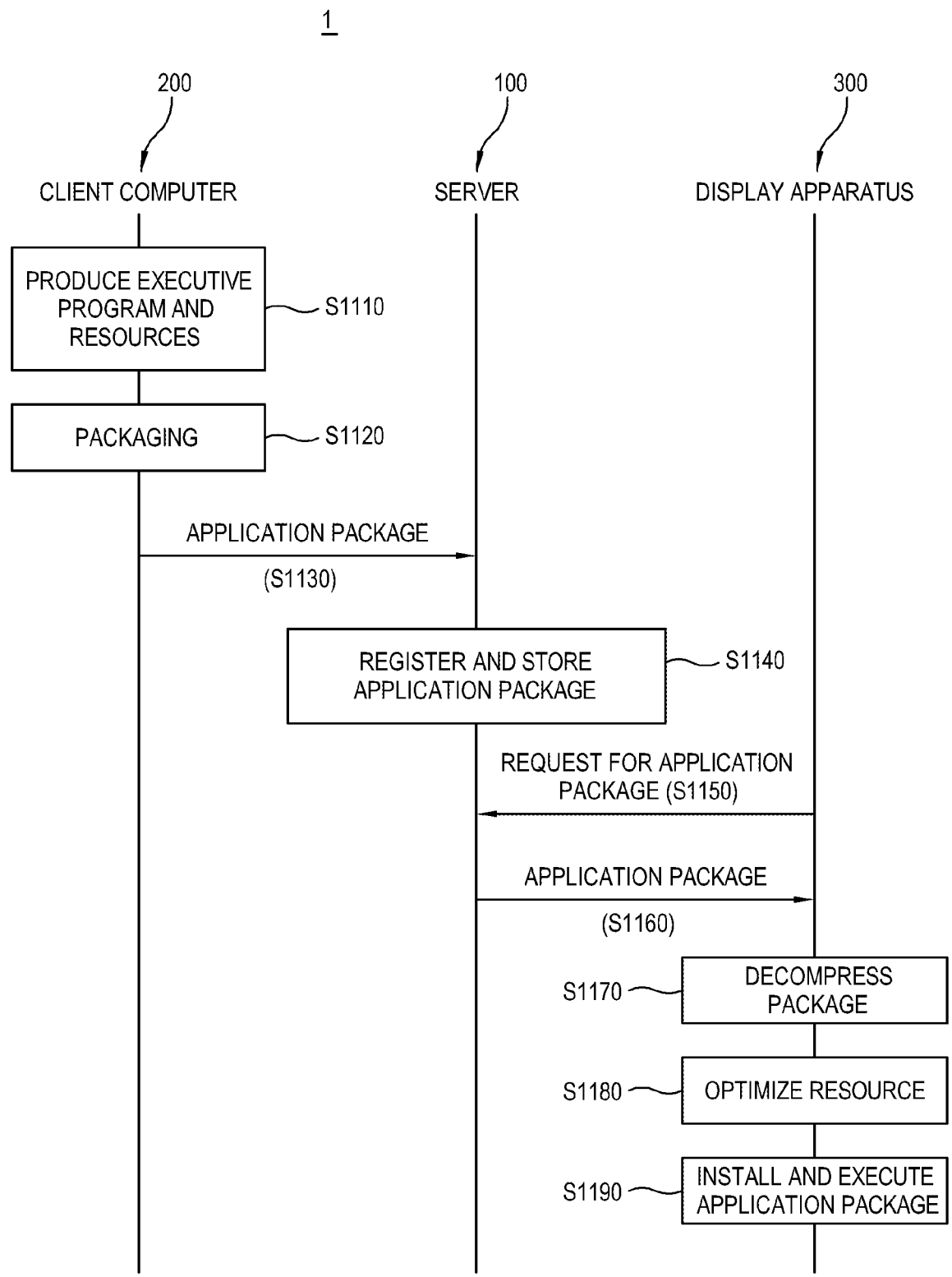

INFORMATION PROCESSING APPARATUS, IMAGE PROCESSING APPARATUS AND CONTROL METHODS THEREOF

CROSS-REFERENCE TO RELATED APPLICATION

This application is based on and claims priority under 35 U.S.C. § 119 to Korean Patent Application No. 10-2015-0102365 filed on Jul. 20, 2015 in the Korean Intellectual Property Office, the disclosure of which is incorporated by reference herein in its entirety.

BACKGROUND

Field

Apparatuses and methods consistent with the example embodiments relate to an information processing apparatus capable of processing and storing therein various pieces of information or data in accordance with preset processes or transmitting them to an external device, an image processing apparatus and control methods thereof, and for example, to an information processing apparatus, an image processing apparatus and control methods thereof, in which, when an application developed by a developer is packaged and transmitted to a user terminal, data is optimized in such an application package.

Description of Related Art

An information processing apparatus is provided to operate and process predetermined information in accordance with certain processes, and refers to an electronic apparatus that basically includes a central processing unit (CPU) for operation, a chipset, a memory, and the like electronic components. The information processing apparatus may be classified in accordance with what information will be processed therein. For example, the information processing apparatus includes a personal computer, a server or the like computer for processing general information; an image processing apparatus for processing image information; etc.

Among the information processing apparatuses, an image processing apparatus processes an image signal/video data received from the exterior in accordance with various video processing processes. The image processing apparatus may display an image based on the processed video data on its own display panel, or output the processed image signal to another display apparatus provided with a panel so that on the corresponding display apparatus can display an image based on the processed image signal. That is, the image processing apparatus may include the panel capable of displaying an image or include no panel as long as it can process the video data. For example, the former may include a display apparatus such as a television (TV), a portable multimedia player (PMP), a tablet personal computer, a mobile phone, etc., and the latter may include a set-top box, etc.

In terms of software, the information processing apparatus implements functions required for various applications as the respective applications are executed on an operating system. In particular, if the information processing apparatus is the image processing apparatus, the image processing apparatus processes such an executed result to be displayed as an image.

The application is offered to a user as follows. The application is first developed by a developer and registered to a server, and the server offers the application to a user terminal. The user terminal downloads the application from the server, and installs and executes it on its own operating system. Since the application is achieved by many pieces of data, it is generally packaged into one file for each distribution and then distributed.

By the way, the application package may include not only data needed for executing the application but also unnecessary data. The unnecessary data increases the total size of the application package, increases time to be taken in downloading and installing the application package, requires high memory or buffer capacity for execution, and delays execution time due to process of the unnecessary data. To minimize these problems, there is a need of improving the package form of the application.

SUMMARY

An information processing apparatus including: a storage configured to store a main program of an application to be installed in an application execution apparatus and first resource data including data corresponding to a plurality of attributes about execution of the main program; and at least one processor configured to create second resource data excluding data corresponding to at least one attribute, which is relatively rarely used (e.g., used less than another attribute of the plurality of attributes) when the main program is executed, from the plurality of attributes of the first resource data so as to have a smaller data size than the first resource data, and to produce a package program including the main program and the created second resource data for installing the application. Thus, it is possible to reduce time to be taken in decoding the resource data when the application is executed.

The storage may store optimization information where the data in the resource data respectively corresponding to plural types of resource data is designated to be deleted in accordance with attributes, and the at least one processor may determine the type of the first resource data, and may determine an attribute to be deleted corresponding to the determined type based on the optimization information. Thus, it is easy to determine low-level data to be deleted from the resource data.

The resource data may include at least one of a video file, an audio file and a multimedia file, and the optimization information may be designated to delete the data having an attribute of meta-data from the resource data. Thus, it is possible to determine unnecessary data in the resource data when the application is executed.

The optimization information may be designated to store resource history information in which some contents of the meta-data to be deleted from the resource data is recorded, and the at least one processor may add the resource history information to the package program. Thus, it is possible to cope with situation requiring meta-data in the future while reducing time to be taken in decoding the resource data.

The optimization information may be designated to convert a first format of the resource data into a preset second format more efficient in reducing the data size than the first format, and the at least one processor may determine a format of third resource data, may convert the third resource data into fourth resource data having the second format designated in the optimization information, and may record a history of the conversion in the resource history information so as to return the fourth resource data in response to an operation of making a request for the third resource data when the application is executed on a preset platform. Thus, it is possible to prevent an error from occurring in executing the application due to change in a file name of the resource data as the resource data is converted into a format having a high efficiency.

The at least one processor may delete at least one piece of sixth resource data overlapped with fifth resource data from the whole resource data of the application, and may record a history of the deletion in the resource history information so as to return the sixth resource data in response to an operation of making a request for the fifth resource data when the application is executed on a preset platform. Thus, it is possible to reduce the total size by deleting the redundant resource data, and prevent an error from occurring in executing the application due to the deletion of the resource data.

The information processing apparatus may further include communication circuitry configured to communicate with the application execution apparatus, wherein the at least one processor may store the package program in the storage, and may send the package program to the application execution apparatus through the communicator so as to be installed in the application execution apparatus in request to a request from the application execution apparatus. Thus, it possible to distribute the optimized package program.

The application may include a web application to be executed on a web browser program. Thus, it is possible to guarantee the execution of the application even though the resource data is changed, on the contrary to the native application for directly controlling the resource data.

An image processing apparatus including: receiver circuitry configured to receive a package program for installing an application including a main program, and first resource data including data corresponding to a plurality of attributes about execution of the main program; and at least one processor configured to install the application to be executable by decompressing the package program for, the at least one processor creating second resource data excluding data corresponding to at least one attribute, which is relatively rarely used (e.g., used less than another attribute of the plurality of attributes) when the main program is executed, from the plurality of attributes of the first resource data so as to have a smaller data size than the first resource data, and installing the application including the main program and the created second resource data. Thus, when the application package of which the resource data is not optimized is received, the resource data of the application package is optimized and then the application is installed, thereby reducing the time to be taken in decoding the resource data when the application is executed.

The method may include: acquiring a main program of an application to be installed in an application execution apparatus and first resource data including data corresponding to a plurality of attributes about execution of the main program; creating second resource data excluding data corresponding to at least one attribute, which is relatively rarely used (e.g., used less than another attribute of the plurality of attributes) when the main program is executed, from the plurality of attributes of the first resource data so as to have a smaller data size than the first resource data; and producing a package program including the main program and the created second resource data for installing the application. Thus, it is possible to reduce time to be taken in decoding the resource data when the application is executed.

The creating the second resource data may include determining a type of the first resource data, and determining an attribute to be deleted corresponding to the determined type based on optimization information, the optimization information may be designated to delete the data in the resource data respectively corresponding to plural types of resource data in accordance with attributes. Thus, it is easy to determine low-level data to be deleted from the resource data.

The resource data may include at least one of a video file, an audio file and a multimedia file, and the optimization information may be designated to delete the data having an attribute of meta-data from the resource data. Thus, it is possible to determine unnecessary data in the resource data when the application is executed.

The optimization information may be designated to store resource history information in which some contents of the meta-data to be deleted from the resource data is recorded, and the producing the package program for installing the application may include adding the resource history information to the package program. Thus, it is possible to cope with situation requiring meta-data in the future while reducing time to be taken in decoding the resource data.

The optimization information may be designated to convert a first format of the resource data into a preset second format more efficient in reducing the data size than the first format, and the creating the second resource data may include: determining a format of third resource data and converting the third resource data into fourth resource data having the second format designated in the optimization information; and recording a history of the conversion in the resource history information so as to return the fourth resource data in response to an operation of making a request for the third resource data when the application is executed on a preset platform. Thus, it is possible to prevent an error from occurring in executing the application due to change in a file name of the resource data as the resource data is converted into a format having a high efficiency.

The creating the second resource data may include: deleting at least one piece of sixth resource data overlapped with fifth resource data from the whole resource data of the application; and recording a history of the deletion in the resource history information so as to return the sixth resource data in response to an operation of making a request for the fifth resource data when the application is executed on a preset platform. Thus, it is possible to reduce the total size by deleting the redundant resource data, and prevent an error from occurring in executing the application due to the deletion of the resource data.

The method may further include: storing the package program, and sending the package program to the application execution apparatus through the communicator so as to be installed in the application execution apparatus in request to a request from the application execution apparatus. Thus, it possible to distribute the optimized package program.

The application may include a web application to be executed on a web browser program. Thus, it is possible to guarantee the execution of the application even though the resource data is changed, on the contrary to the native application for directly controlling the resource data.

A method of controlling an image processing apparatus, the method including: receiving a package program for installing an application including a main program, and first resource data including data corresponding to a plurality of attributes about execution of the main program; and installing the application to be executable by decompressing the package program, the installing the application includes: creating second resource data excluding data corresponding to at least one attribute, which is relatively rarely used (e.g., used less than another attribute of the plurality of attributes) when the main program is executed, from the plurality of attributes of the first resource data so as to have a smaller data size than the first resource data; and installing the application including the main program and the created second resource data. Thus, when the application package of which the resource data is not optimized is received, the resource data of the application package is optimized and then the application is installed, thereby reducing the time to be taken in decoding the resource data when the application is executed.

BRIEF DESCRIPTION OF THE DRAWINGS

The above and/or other aspects will become apparent and more readily appreciated from the following detailed description, taken in conjunction with the accompanying drawings, in which like reference numerals refer to like elements, and wherein:

FIG. 10 is a diagram illustrating an example attribute database (DB) according to the second example embodiment;

FIG. 16 is a diagram illustrating an attribute DB according to the third example embodiment;

FIG. 28 is a flowchart illustrating producing and distributing an application in a system according to a seventh example embodiment.

DETAILED DESCRIPTION

Below, example embodiments will be described in detail with reference to accompanying drawings. The following descriptions of the example embodiments are made by referring to elements shown in the accompanying drawings, in which like numerals refer to like elements having substantively the same functions.

In the description of the example embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the disclosure.

Further, the example embodiments will describe only elements directly related to the idea of the disclosure, and description of the other elements will be omitted. However, it will be appreciated that the elements, the descriptions of which are omitted, are not unnecessary to realize the apparatus or system according to the example embodiments. In the following descriptions, terms such as "include" or "have" refer to presence of features, numbers, steps, operations, elements or combination thereof, and do not exclude presence or addition of one or more other features, numbers, steps, operations, elements or combination thereof.

Figure 1:
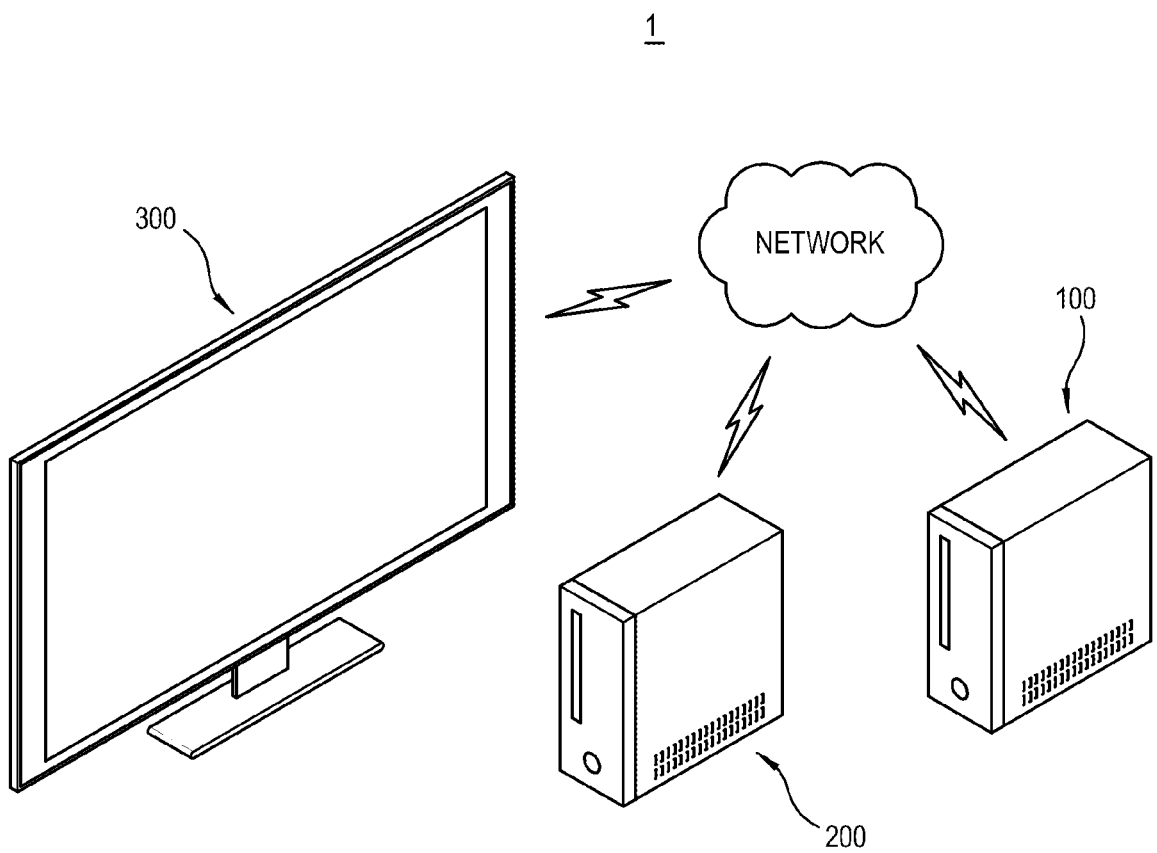
FIG. 1 is a diagram illustrating an example system according to a first example embodiment.

FIG. 1 is a view of a system 1 according to a first example embodiment;

As shown in FIG. 1, the system 1 according to the first example embodiment includes a plurality of information processing apparatuses 100, 200 and 300 connected to a network and communicating with one another. The information processing apparatus 100, 200 or 300 may be achieved by a general electronic apparatus capable of processing various kinds and characteristics of information, data and signals without limitation. For example, the system 1 according to this example embodiment includes a server 100, a client computer 200 and a display apparatus 300.

The server 100 stores various web-based contents, and provides contents to the display apparatus 300 in response to a request of the display apparatus 300. To this end, interactive communication is achieved between the server 100 and display apparatus 300 of the system 1.

The client computer 200 refers to a general personal computer (PC). Like the display apparatus 300, the client computer 200 serves as a client to the server 100. In particular, the client computer 200 in this embodiment may produce and provide contents stored in the server 100.

The display apparatus 300 may for example be achieved by a television (TV), which can not only display a broadcast image based on a broadcast content received from a transmitter (not shown) of a broadcasting station, but also display an image based on various image contents received from a locally connected image reproducing device (not shown). Further, the display apparatus 300 can be connected to the server 10 through the network, and receive the image contents from the server 100 by a streaming method or a video-on-demand (VOD) method. Further, the display apparatus 300 may receive web-based contents such as a web page or a web application from the server 100. In this example embodiment, the display apparatus 300 is the TV, but not limited thereto. Alternatively, the display apparatus may include various apparatuses capable of displaying an image, such as a tablet PC, a mobile phone, etc.

Figure 2:
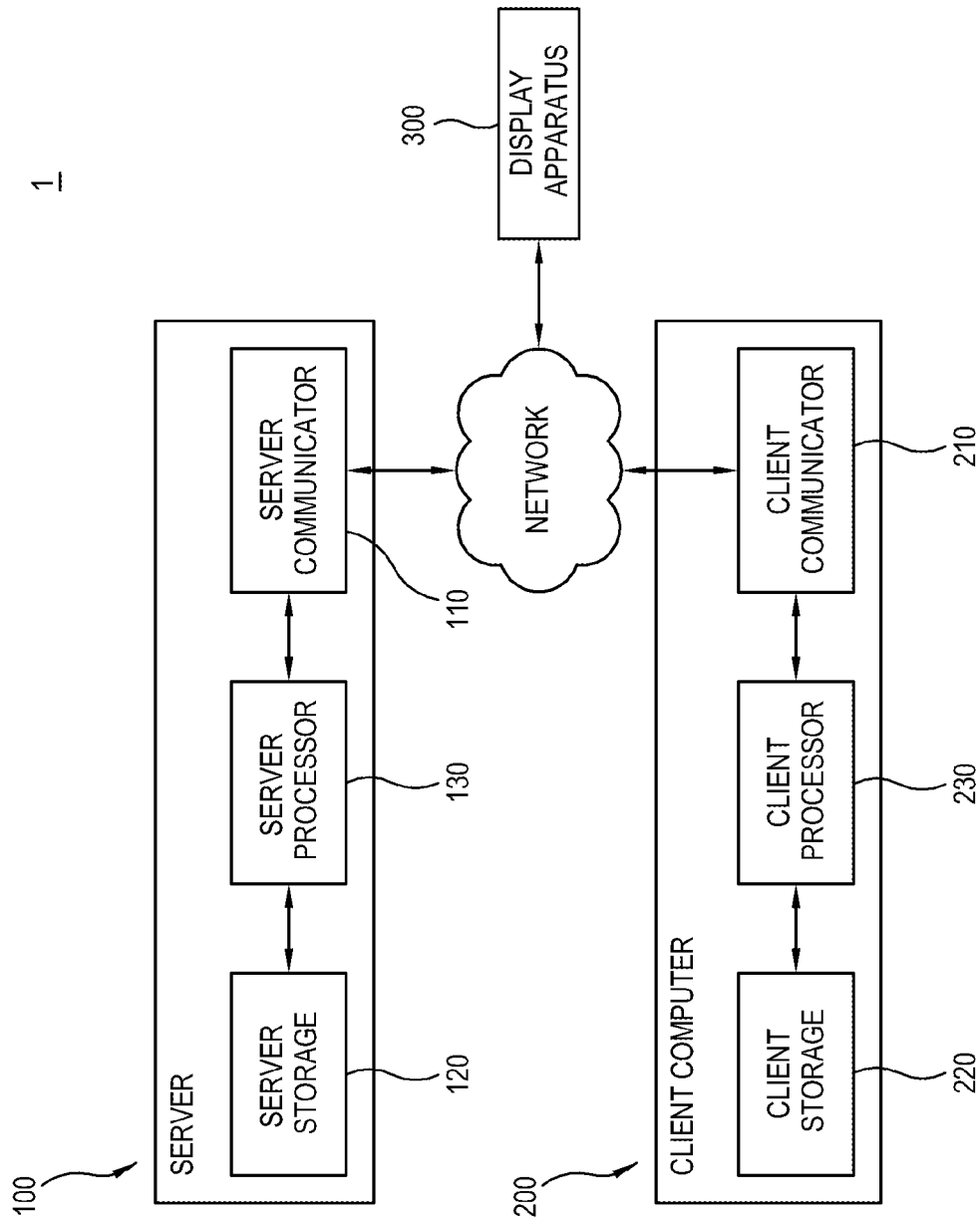
FIG. 2 is a block diagram illustrating an example server and a client computer in the system of FIG. 1.

FIG. 2 is a block diagram of the server 100 and the client computer 200.

As shown in FIG. 2, the server 100 includes a server communicator (e.g., including communication circuitry) 110 for communicating with the client computer 200 or the display apparatus 300 through the network, a server storage 120 for storing data, and a server processor 130 for controlling general operations of the server 100.

Further, the client computer 200 includes a client communicator 210 for communicating with the server 100 through the network, a client storage 220 for storing data, and a client processor 230 for controlling general operations of the client computer 200.

Below, the elements of the client computer 200 will be described. The client computer 200 and the server 100 differently serve as a client and a server in the system 1 but are typical computers, respectively. Therefore, the basic elements of the client computer 200 are also applicable to the server 100.

The client communicator 210 transmits and receives data so that the client computer 200 can interactively communicate with the server 100 and the like external device. The client communicator 210 may be achieved by an assembly of communication ports or communication modules respectively corresponding to communication standards, and its supportable protocols and communication targets are not limited to one kind or type. For example, the client communicator 210 may include a wireless fidelity (Wi-Fi) communication module (not shown) for wireless network communication with an access point (Ap), an Ethernet module (not shown) for separate wired communication, or the like.

The client storage 220 stores various pieces of data under process and control of the client processor 230. The client storage 220 is accessed by the client processor 230 to apply reading, writing, editing, deleting, updating, etc. to data. The client storage 220 is achieved by a flash memory, a hard disc drive or the like nonvolatile memory so as to preserve data regardless of supply of power.

The client processor 230 controls the operations of the client computer 200 and performs processes required in the client computer 200. For example, the client processor 230 processes data stored in the client storage 220, and transmits the processed data to the server 100 through the client communicator 210.

If an application developer uses the client computer 200 to produce an application, the client processor 230 produces and processes the application in accordance with the developer's input and sends the produced application to the server 100. The server processor 130 controls the server storage 120 to store the application received from the client computer 200 therein, and offers the application stored in the server storage 120 to the display apparatus 300 in response to a request for the application from the display apparatus 300.

Figure 3:
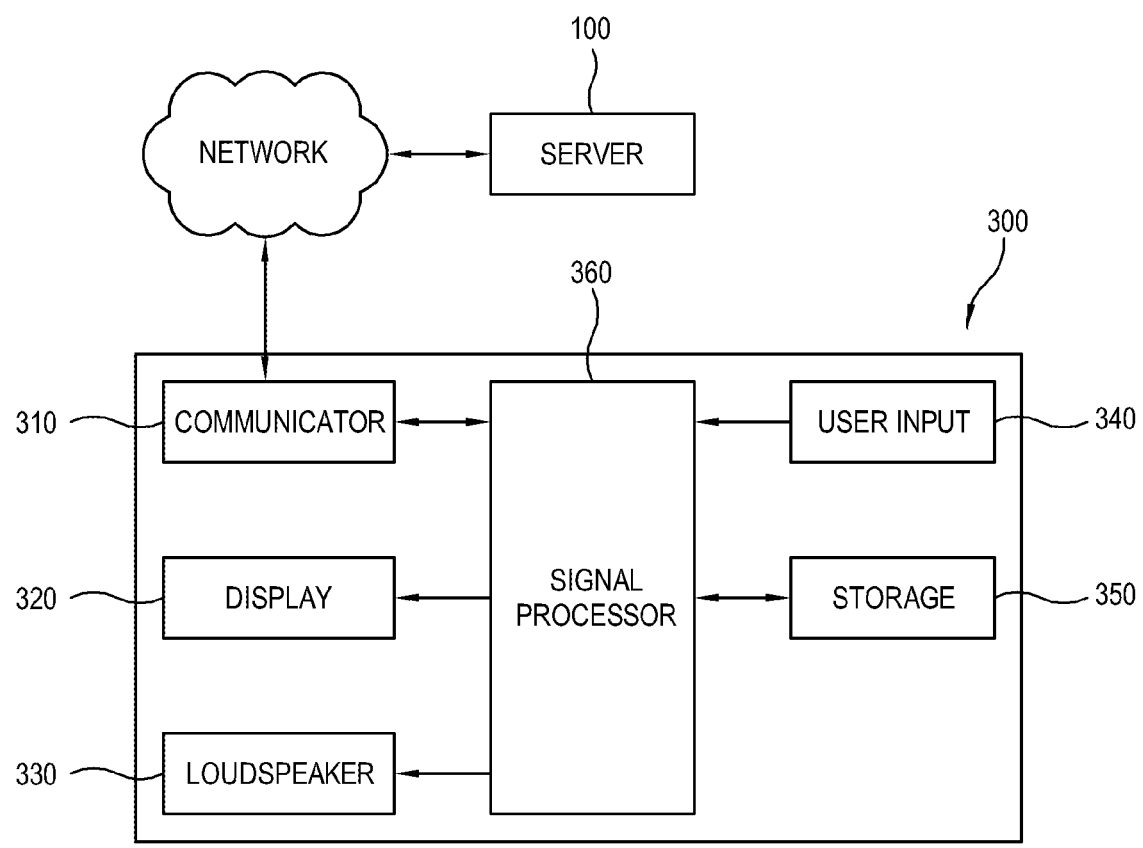
FIG. 3 is a block diagram illustrating an example display apparatus in the system of FIG. 1.

FIG. 3 is a block diagram of a display apparatus in the system of FIG. 1.

As shown in FIG. 3, the display apparatus 300 includes a communicator (e.g., including communication circuitry) 310 for receiving data from the exterior, a display 320 for displaying an image based on video data of a transport stream received in the communicator 310, the loudspeaker 330 for making a sound based on audio data of the transport stream received in the communicator 310, a user input 340 for receiving a user's input, a storage 350 for storing data, and a signal processor 360 for controlling and calculating general operations of the display apparatus 300.

The communicator 310 receives various pieces of data from the exterior through a network. As an example of the data, there is a transport stream received from various video sources. The communicator 310 is not limited to only receiving a signal from the exterior, but may transmit a signal to the exterior, thereby performing interactive communication. The communicator 310 may be achieved by an assembly of communication ports or communication modules respectively corresponding to a plurality of communication standards, and its supportable protocols and communication targets are not limited to one kind or type. For example, the communicator 310 may include a radio frequency integrated circuit (RFIC) for receiving an RF signal, a Wi-Fi communication module (not shown) for wireless network communication, an Ethernet module (not shown) for wired network communication, and a universal serial bus (USB) port (not shown) for local connection with a USB memory (not shown) or the like.

The display 320 displays an image based on an image signal processed by the signal processor 360. There are no limits to the types of the display 320. For example, the display 320 may be achieved by a liquid crystal display (LCD) panel or an organic light emitting diode (OLED) display panel. Further, the display 230 may include additional elements in accordance with the types of the panel as well as the display panel. For example, if the display 320 is achieved by the liquid crystal, the display 130 includes a liquid crystal display (LCD) panel (not shown), a backlight unit (not shown) for emitting light to the LCD panel, and a panel driver (not shown) for driving the LCD panel (not shown).

The loudspeaker 330 outputs a sound based on an audio signal processed by the signal processor 360. The loudspeaker 140 vibrates air in accordance with an audio signal and changes air pressure to thereby make a sound. The loudspeaker 330 includes a unit loudspeaker provided corresponding to an audio signal of one channel. In this embodiment, the loudspeaker may include a plurality of unit loudspeakers respectively corresponding to audio signals of the plurality of channels.

There are various kinds of loudspeakers 330 in accordance with frequency bands of a sound to be output. The loudspeakers 330 include a sub-woofer corresponding to a frequency band of 20 Hz to 99 Hz, a woofer corresponding to a frequency band of 100 Hz to 299 Hz, a mid-woofer corresponding to a frequency band of 300 Hz to 499 Hz, a mid-range speaker corresponding to a frequency band of 500 Hz to 2.9 KHz, a tweeter speaker corresponding to a frequency band of 3 KHz to 6.9 KHz, and a super-tweeter speaker corresponding to a frequency band of 7 KHz to 20 KHz, in which one or more among them are selected and applied to the display apparatus 300.

The user input 340 transmits various preset control commands or information to the signal processor 360 in accordance with a user's control or input. The user input 340 transmits various events, which occurs by a user's control in accordance with a user's intention, to the signal processor 360. The input unit 340 may be variously achieved in accordance with information input methods. For example, the input unit 340 may include a button provided on an outer side of the display apparatus 300, a remote controller separated from the display apparatus 300, a touch screen formed integrally with the display 320, and an input device provided to communicate with the display apparatus 300.

The storage 350 stores various pieces of data under process and control of the signal processor 360. The storage 350 is accessed by the signal processor 360 and performs reading, writing, editing, deleting, updating or the like with regard to data. The storage 350 is achieved by a flash-memory, a hard-disc drive or the like nonvolatile memory to preserve data regardless of supply of system power in the display apparatus 300.

The signal processor 360 performs various processes with regard to the transport stream received in the communicator 310. When the transport stream is received in the communicator 310, the signal processor 360 applies a video processing process to the video signal, and outputs the processed video signal to the display 320, thereby displaying an image on the display 320.

There are no limits to the kind of image processing process performed by the signal processor 360, and the video processing process may for example include demultiplexing for separating the transport stream into sub streams such as a video signal, an audio signal and additional data, decoding corresponding to video formats of a video signal, de-interlacing for converting a video signal from an interlaced type into a progressive type, scaling for adjusting a video signal to have a preset resolution, noise reduction for improving image quality, detail enhancement, frame refresh rate conversion, etc.

Since the signal processor 360 can perform various processes in accordance with the kinds and characteristics of signal or data, the process performable by the signal processor 360 is not limited to the video processing process. Further, data processible by the signal processor 360 is not limited to only data received in the signal receiver 310. For example, the signal processor 360 performs an audio processing process with regard to an audio signal extracted from a transport stream, and outputs the processed audio signal to the loudspeaker 330. Further, if a user's voice is input to the display apparatus 300, the signal processor 360 may process the voice in accordance with a preset voice recognition processing process. The signal processor 360 is achieved by a system-on-chip (SOC), in which many functions are integrated, or an image processing board (not shown) where individual chip-sets for independently performing the processes are mounted to a printed circuit board.

In this example embodiment, the signal processor 360 may make a request for a predetermined application to the communicator 310. If the server 100 transmits data of the application in response to the request, the signal processor 360 installs and executes the application received in the communicator 310 on the operating system. If the application is received in the form of a package through the communicator 310, the signal processor 360 decompresses the application package in units of files and then installs the files.

The display apparatus 300 may have specifically different hardware components in accordance with the types of the display apparatus 300 and the functions supported by the display apparatus 300. For example, a hardware component to be tuned to a certain frequency for receiving a broadcast signal may be included if the display apparatus 300 is a TV or a set-top box, but may be excluded if the display apparatus 300 is a tablet PC.

Below, the signal processor 360 of when the display apparatus 300 is the TV will be described.

Figure 4:
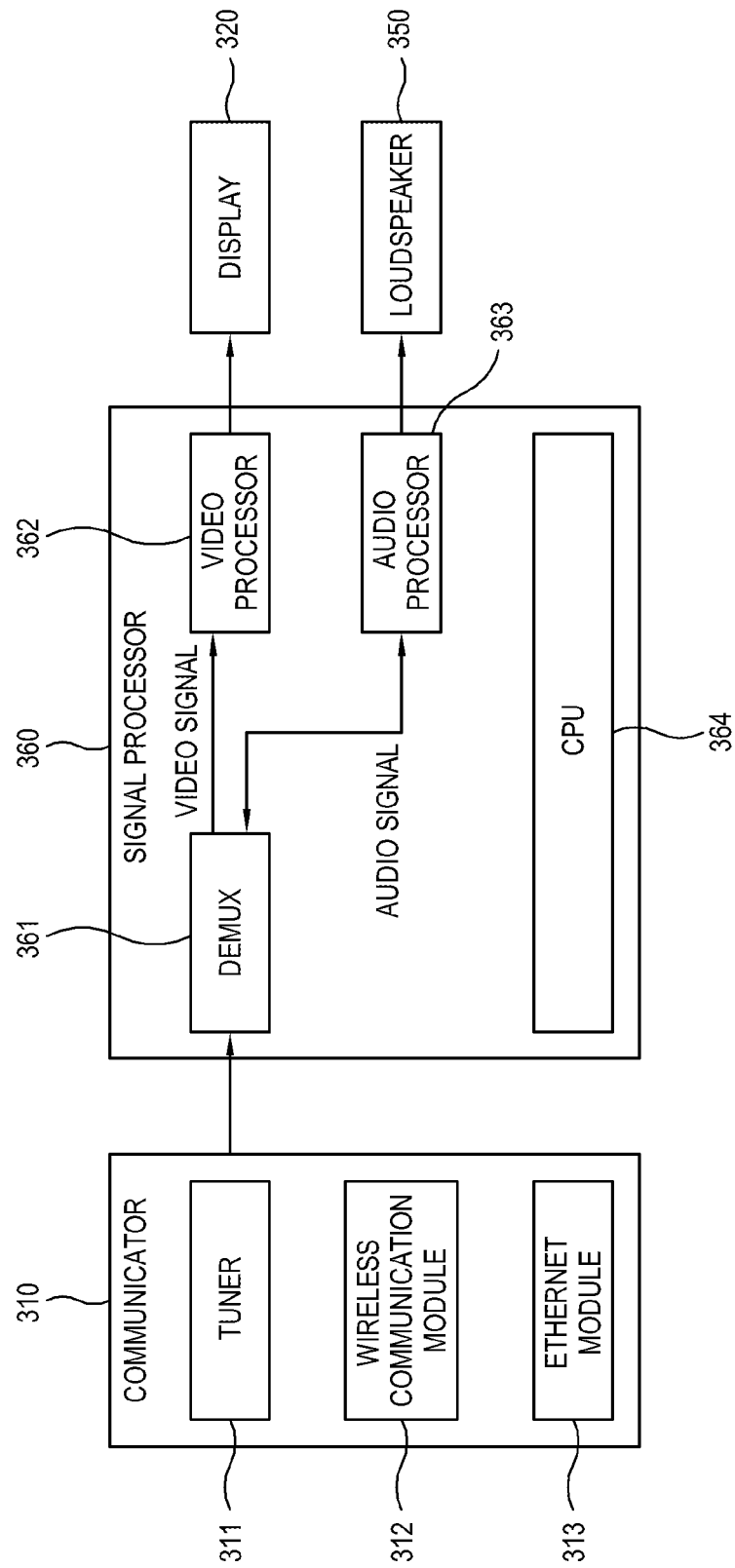
FIG. 4 is a block diagram illustrating an example signal processor in the display apparatus of FIG. 3.

FIG. 4 is a block diagram of the signal processor 360. FIG. 4 shows only basic elements of the signal processor 360, and an actual product of the display apparatus 300 includes additional elements besides the elements described below.

As shown in FIG. 4, the communicator 310 includes various communication circuitry, including, for example, a tuner 311 to be tuned to a certain frequency to receive a broadcast stream, a wireless communication module 312 for wireless communication, and an Ethernet module 313 for wired communication. Further, the signal processor 360 includes a deMUX 361 for dividing the transport stream received from the communicator 310 into a plurality of sub signals, a video processor 362 for processing a video signal among the sub signals output from the deMUX 361 in accordance with the video processing process and outputting the processed video signal to the display 320, an audio processor 363 for processing an audio signal among the sub signals output from the deMUX 361 in accordance with the audio processing process and outputting the processed audio signal to the loudspeaker 330, and a central processing unit (CPU) 364 performs calculation and control for the operations of the signal processor 360.

When a broadcast stream is received in an RF antenna (not shown), the tuner 311 is tuned to a frequency of a designated channel to receive a broadcast stream and converts the broadcast stream into a transport stream. The tuner 311 converts a high frequency of a carrier wave received via the antenna (not shown) into an intermediate frequency band and converts it into a digital signal, thereby generating a transport stream. To this end, the tuner 311 has an analog/digital (A/D) converter (not shown). Alternatively, the A/D converter (not shown) may be designed to be included in not the tuner 311 but a demodulator (not shown).

The deMUX (or demultiplexer) 361 performs a reverse operation of the multiplexer (not shown). That is, the deMUX 361 connects one input terminal with a plurality of output terminals, and distributes a stream input to the input terminal to the respective output terminals in accordance with selection signals. For example, if there are four output terminals with respect to one input terminal, the deMUX 361 may select each of the four output terminals by combination of selection signals having two levels of 0 and 1.

In the case where the deMUX 361 is applied to the display apparatus 300, the deMUX 361 divides the transport stream received from the tuner 311 into the sub signals of a video signal and an audio signal and outputs them to the respective output terminals.

The deMUX 361 may use various methods to divide the transport stream into the sub signals. For example, the deMUX 361 divides the transport stream into the sub signals in accordance with packet identifiers (PID) given to packets in the transport stream. The sub signals in the transport stream are independently compressed and packetized according to channels, and the same PID is given to the packets corresponding to one channel so as to be distinguished from the packets corresponding to another channel. The deMUX 361 classifies the packets in the transport stream according to the PID, and extracts the sub signals having the same PID.

The video processor 362 decodes and scales the video signal output from the deMUX 361 and outputs it to the display 320. To this end, the video processor 362 includes a decoder (not shown) that returns the video signal to a state before an encoding process by performing an opposite process to the encoding process with regard to the video signal encoded by a certain format, and a scaler (not shown) that scales the decoded video signal in accordance with the resolution of the display 320 or a separately designated resolution. If the video signal output from the deMUX 361 is not encoded by a certain format, i.e. not compressed, the decoder (not shown) of the video processor 362 does not process this video signal.

The audio processor 363 amplifies an audio signal output from the deMUX 361 and outputs the amplified audio signal to the loudspeaker 330. To this end, the audio processor 363 includes a digital signal supplier (not shown) for outputting a digital audio signal; a pulse width modulation (PWM) processor (not shown) for outputting a PWM signal based on a digital signal output from the digital signal supplier (not shown), an amplifier (not shown) for amplifying the PWM signal output from the PWM processor (not shown), and an LC filter (not shown) for filtering the PWM signal amplified by the amplifier (not shown) by a predetermined frequency band to thereby demodulate the PWM signal.

The CPU 364 is an element for performing central calculation to operate general elements in the signal processor 360, and plays a central role in basically parsing and calculating data. The CPU 364 internally includes a processor register (not shown) in which commands to be processed are stored; an arithmetic logic unit (ALU) (not shown) being in charge of comparison, determination and calculation; a control unit (not shown) for internally controlling the CPU 364 to analyze and carry out the commands; an internal bus (not shown), a cache (not shown), etc.

The CPU 364 performs calculation needed for operating the elements of the signal processor 360, such as the deMUX 361, the video processor 362 and the audio processor 363. Alternatively, some elements of the signal processor 360 may be designed to operate without the data calculation of the CPU 364 or by a separate microcontroller (not shown).

Below, a principle of executing an application in the display apparatus will be described.

Figure 5:
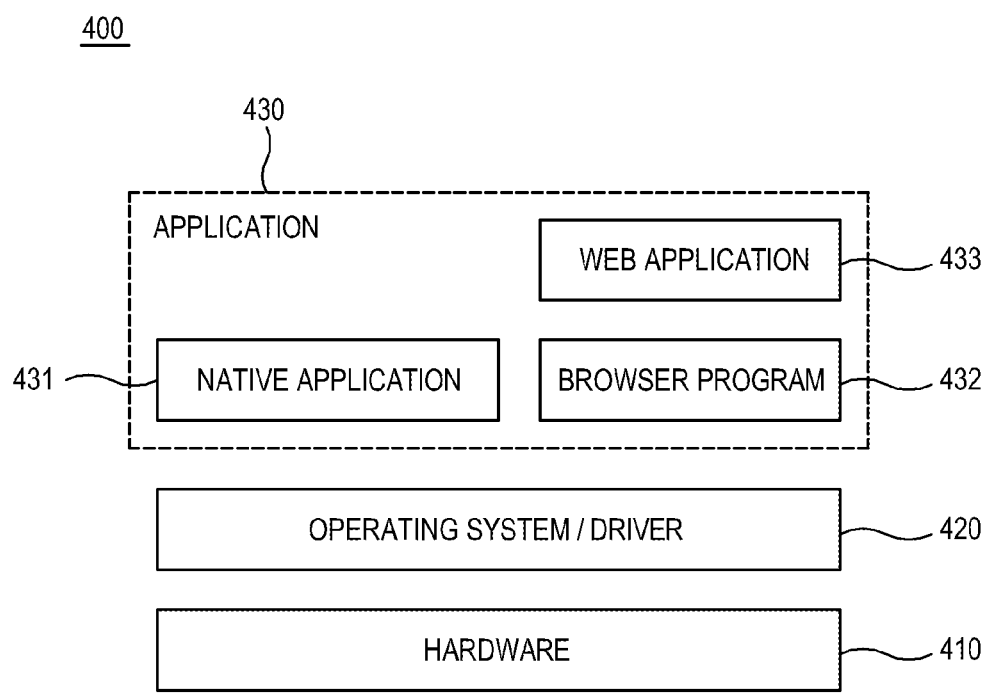
FIG. 5 is a block diagram illustrating an example hierarchical structure of platforms for the display apparatus of FIG. 1.

FIG. 5 is a block diagram showing a hierarchical structure of platforms 400 for the display apparatus.

As shown in FIG. 5, platforms 400 of the display apparatus include hardware 410 of the lowest layer, a an operating system and driver 420 higher than the hardware 410 and controlling the hardware 410, and an application 430 executed on the operating system 420.

For example, the hardware 410 includes general elements of the display apparatus 300 (see FIG. 3), in particular, the signal processor 360 (see FIG. 3).

The operating system 420 refers to system software that manages the hardware 410 of the display apparatus and provides a hardware abstraction platform and a common system service in order to execute the general application 430. The operating system 420 provides system resources such as the CPU or the like to be used by the executed application 430, and abstracts them to offer a service such as a file system and the like. The operating system 420 provides a user with environments for easily and efficiently executing the application. Further, the operating system 420 assigns, administers and protects the hardware 410 and software resources of the display apparatus; monitors improper use of the resources; and manages the operation and control of the resources of input/output devices and the like.

The driver 420 is a program that operates as a part of a kernel for controlling the hardware 410. The driver 420 performs communication with a device through a lower-layered system connected to a system bus or hardware 410, and issues a command to the device when the command of the driver 420 is called by the application 430. If the device returns the data to the driver 420, the driver 420 transmits data again as the command for the application 430. The driver 420 is dependent on the hardware 410 and conforms with a certain operating system 420. In general, the driver 420 accesses a register of a device chip and controls the hardware 410, thereby serving as a link for the application 430 using the hardware 410 and peripheral devices. The driver 420 may be included as a lower-layered element in the operating system 420.

The application 430 or the application software broadly means any software executed on the operating system 420, and narrowly means software directly handled by a user on the operating system 420. In the latter case, the application 430 may be a boot-loader, the operating system, the driver 420 and like complementary set of the system software.

The application 430 is divided into a native application 430 and an web application 430.

The native application 431 is a binary execution file downloaded and locally stored in the display apparatus. The native application 431 may directly access an application programming interface (API) given in the operating system 420 and use a native function of the operating system 420.

The native application 431 is produced as follows. A developer first writes a source code and makes resources such as video, audio, moving image and the like resources. The developer compiles the source code using a tool supported by the operating system 420 with the resources into a binary execution file for distribution. This tool is a software development kit, which is unique according to the operating systems 420. Since the tools are different according to the operating systems 420, the native application 431 customized to meet a certain platform is not usable or is difficult to be used in a different platform. Details of the resource will be described later.

The web application 433 may be downloaded and locally stored in the display apparatus like the native application 431. However, the web application 433 is positioned on a web-browser program 432 or browser program 432 on the contrary to the native application 431 positioned directly above the operating system 420 in terms of a hierarchical structure. This means that the web application 433 is not executable alone on the operating system 420 but has to be executed on the browser program 432 after the browser program 432 is first executed.

The browser program 432 is regarded as one of the native applications 431. That is, the browser program 432 is an application for executing a web page of Internet or the web application 433. For example, the browser program 432 executes and displays a web page or web application 433 produced based on a hypertext mark-up language (HTML) standards, and supports a state-of-the-art function of HTML5 such as cascading style sheets 3 (CSS3), JavaScript, etc.

The browser program 432 is universally produced and applied to be executed in the platform of various operating systems 420, and thus the web application 433 supports multi-platforms on the contrary to the native application 431. That is, source codes are separately required according to respective platforms in order to make the native application 431 support the multi-platforms. On the other hand, the web application 433 is executable on any platforms driven by the browser program 432 as long as it is produced to be executed on the corresponding browser program 432.

When the browser program 432 is displayed as an image, the browser program 432 includes a web view where a web page or the web application 433 are displayed, and a browsing frame displayed in the form of surrounding the web view and having options for adjusting functions related to the web page or the web application 433.

While the native application 431 is translated into a machine language and distributed, the web application 433 is distributed without translation and then translated into the machine language and executed by the browser program 432.

On the contrary to the native application 431 independently executed by directly interworking with the operating system 420, the web application 433 is executed within the browser program 432 and this means as follows. As a kind of native application 431, the browser program 432 itself is directly accessible to an application program interface (API) of the operating system 420. On the other hand, the web application 433 executed in the browser program 432 has a limit to the number of accessible APIs of the operating system 420. That is, the native application 431 has great access rights to the operating system 420 and the hardware 410, but the web application 433 has limited access rights to the operating system 420 and the hardware 410.

Due to this difference between the native application 431 and the web application 433, there is also a difference in resource management between them when a certain application is executed.

Below, a structure of the web platforms focused on the web application will be described.

Figure 6:
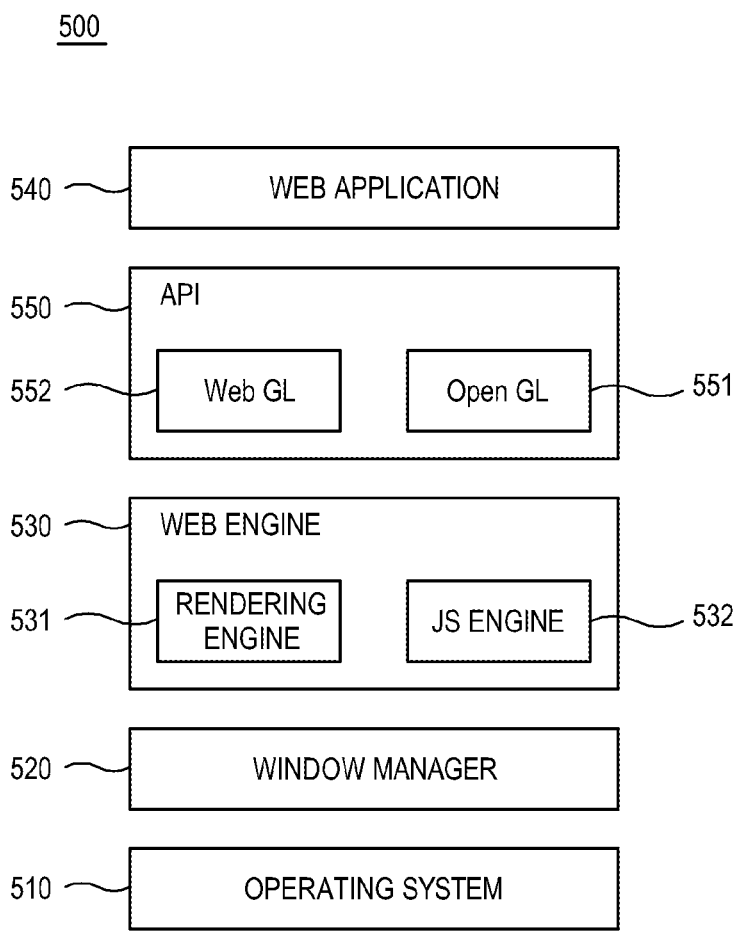
FIG. 6 is a block diagram illustrating an example hierarchical structure of web platforms for the display apparatus of FIG. 1.

FIG. 6 is a block diagram showing a hierarchical structure of the web platforms 500 for the display apparatus. From the foregoing platform 400 (see FIG. 5), the web platforms 500 shows a structure related to execution of the web application 540 in more detail.

As shown in FIG. 6, the web platforms 500 include an operating system 510 of the lowest layer, a Window manager 520 higher than the operating system 510, and a web engine 530 and an API 550 higher than the Window manager 520. The web application 540 is executed on the web engine 530 and API 550. Further, the web engine 530 includes a rendering engine 531, and a JavaScript (JS) engine 532. Here, the API 550 includes an OpenGL 551 and a WebGL 552. The web engine 530 and the Window manager 520 belong to the browser program.

The Window manager 520 manages process and display of a plurality of windows by the browser program. Here, the window refers to a browsing frame and a web view included in an image of the browser program. The Window manager 520 combines the web view, i.e. the window displayed by the web engine 530 with the browsing frame in the layer lower than the web engine 530, thereby processing and displaying the whole browsing image.

The web engine 530 processes an image of the web application 540 or web page to be displayed on the web view. In comparison with the Window manager 520 the web engine 530 performs image processing for the web application 540. Differently, the Window manager 520 processes the window of the web application 540 displayed by the web engine 530 to be displayed together with a separate window. That is, the web engine 530 gets involved in only rendering the web application 540.

The rendering engine 531 is also called a web core. The rendering engine 531 analyzes the web application 540 or the HTML and CSS structures of the web page, and renders the analysis result to be displayed as an image. The rendering engine 531 may for example include a WebKit engine and a Gecko engine. The WebKit engine has started from an open source engine produced for operating in the first Linux platform. A rendering class of the WebKit engine employs a runtime type information (RTTI) technique as a function involved in a C++ compiler. The RTTI technique is to determine a type of an object when it is executed.

The JS engine 532 is also called a JS parser. The JS engine 532 analyzes a Java Script code of the web page and processes it to be executed.

The API 550 refers to an interface used by an application to control the functions provided by the operating system 510 or a programming language. That is, the API 550 is a set of subroutines or functions to be called by an application for a certain process to another program supporting the corresponding application. The API 550 is achieved to call a function to be connected to a certain subroutine for execution in the application. Therefore, one API 550 has several program modules or routines that have already been provided or have to be connected for performing a requested job by a call of a function.

The OpenGL 551 refers to 2D and 3D graphic API standards established by Silicon Graphics in 1992, and supporting intersecting application programming between programming languages or platforms. The OpenGL 551 uses about 250 function calls to create a simple geometrical figure to a complicated 3D scene.

A graphic library is classified into a high level and a low level with respect to concreteness, and the OpenGL 551 belongs to the low level library. A virtual reality modeling language (VRML) and the like high-level library draws a scene by defining a relationship between objects. On the other hand, a low-level library is focused on rendering rather than modeling, and issues detailed commands one by one, thereby drawing the most fundamental element of an object. The low-level library is more difficult to be used but makes a more detailed description possible than the high-level library.

The OpenGL 551 includes two libraries of a graphics library (GL) and a graphics library utility (GLU). The GL is a main library of providing a basic drawing function, and corresponds to a main body of the OpenGL 551. The GL includes functions for rendering elementary figures. The GLU is a utility library for assisting the GL. The GLU provides high-quality functions such as division, projection, etc. and also provides a convenient function of creating a 3D figure.

The WebGL 552 is a web-based graphics library. The WebGL 552 may be used with a Java Script language, and provides an interactive 3D graphic in a compatible web browser. The WebGL 552 is a part of a canvas HTML element providing a 3D graphics API without using plugin.

The WebGL 552 is based on OpenGL ES 2.0 and provides a programming interface for using a 3D graphic. Here, the OpenGL ES is an OpenGL for an embedded terminal. The OpenGL ES is a subset of OpenGL, i.e. a 3D computer graphics API, for a mobile phone, a personal digital assistant, etc.

To display a graphic object of the web application 540, the OpenGL 551 is called and loaded into a Texture by calling the OpenGL 551 with respect to the corresponding graphic object. However, in case of a web-based graphic object, it may be structurally difficult to directly call a function of OpenGL 551. Therefore, a function of WebGL 552 is called with respect to a graphic object, and a corresponding function of the OpenGL 551 is called again by the called function of WebGL 552. That is, the web-based graphic object needs to call the OpenGL 551 via the call of the WebGL 552.

Below, operations of producing and distributing an application will be described.

Figure 7:
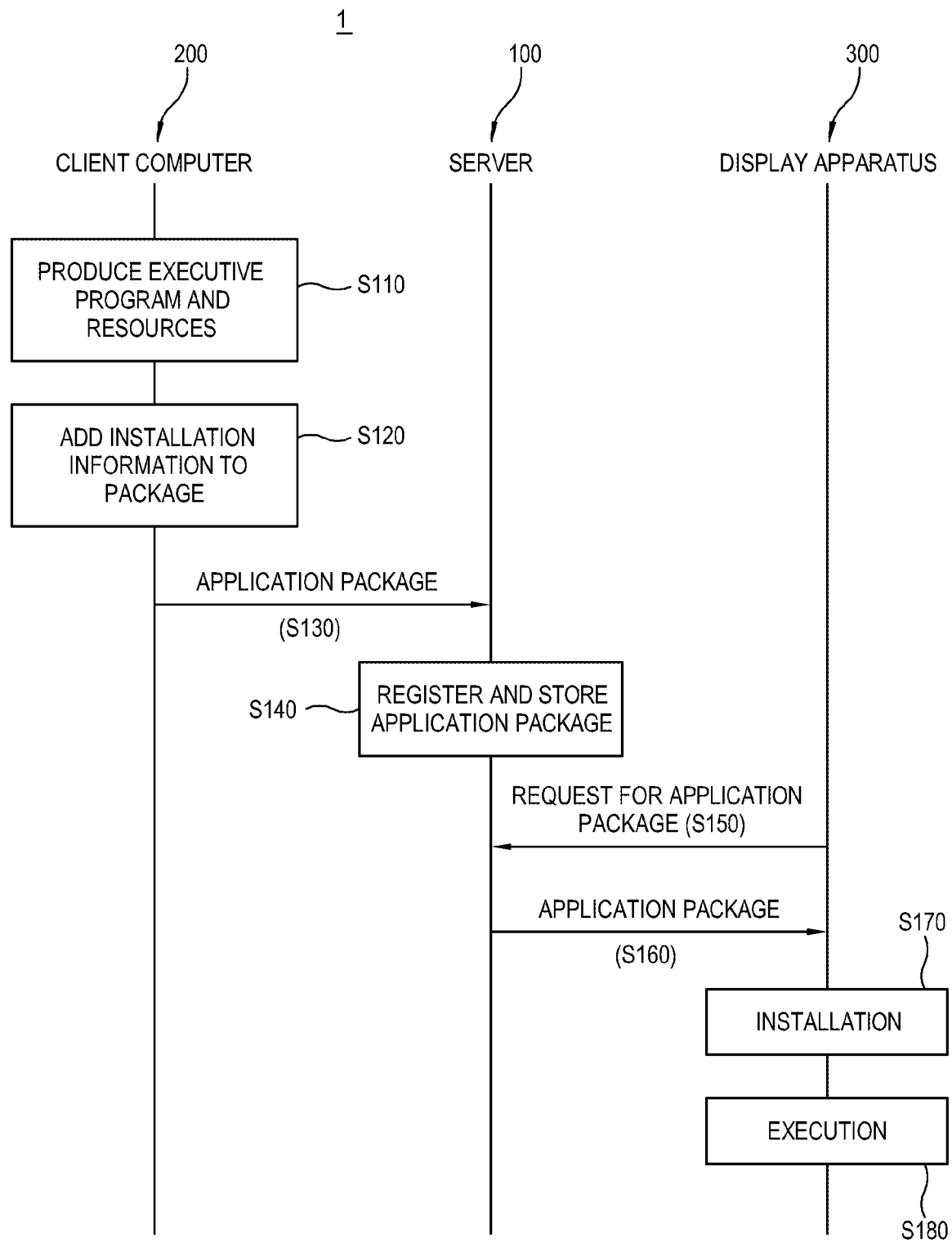
FIG. 7 is a flowchart illustrating an example of producing and distributing an application in the system of FIG. 1.

FIG. 7 is a flowchart of producing and distributing an application in the system 1.

As shown in FIG. 7, at operation S110 the client computer 200 produces an executive program necessary for driving the application, and a resource selectively called and used by the executive program.

At operation S120 the client computer 200 makes the executive program and the resource be packaged with installation information, thereby creating the application package. The installation information is information to be referred in the future when the application is installed at the display apparatus 300. For example, it is possible based on the installation information to designate data location or data address where the executive program and the resource in the application are copied to the operating system of the display apparatus 300.

In the packaging operation S120, the package may be compressed by a preset format into a single file to be easily distributed. As an example of the application package, there is android package (APK) of an Android platform.

At operation S130 the client computer 200 sends the application package to the server 100.

At operation S140 the server 100 registers and stores the application package received from the client computer 200.

At operation S150 the server 100 receives a request for the application package from the display apparatus 300. Thus, at operation S160 the server 100 sends the application package corresponding to the request to the display apparatus 300.

At operation S170 the display apparatus 300 extracts the executive program, the resource, the installation information or the like data by decompressing the application package received from the server 100, and installs an application on the operating system in accordance with the installation information.

At operation S180 the display apparatus 300 executes the installed application.

Like this, according to this example embodiment, the application is produced and packaged in the client computer 200, so that the application package can be sent to the server 100.

Below, operations of packaging the application will be described in more detail.

Figure 8:
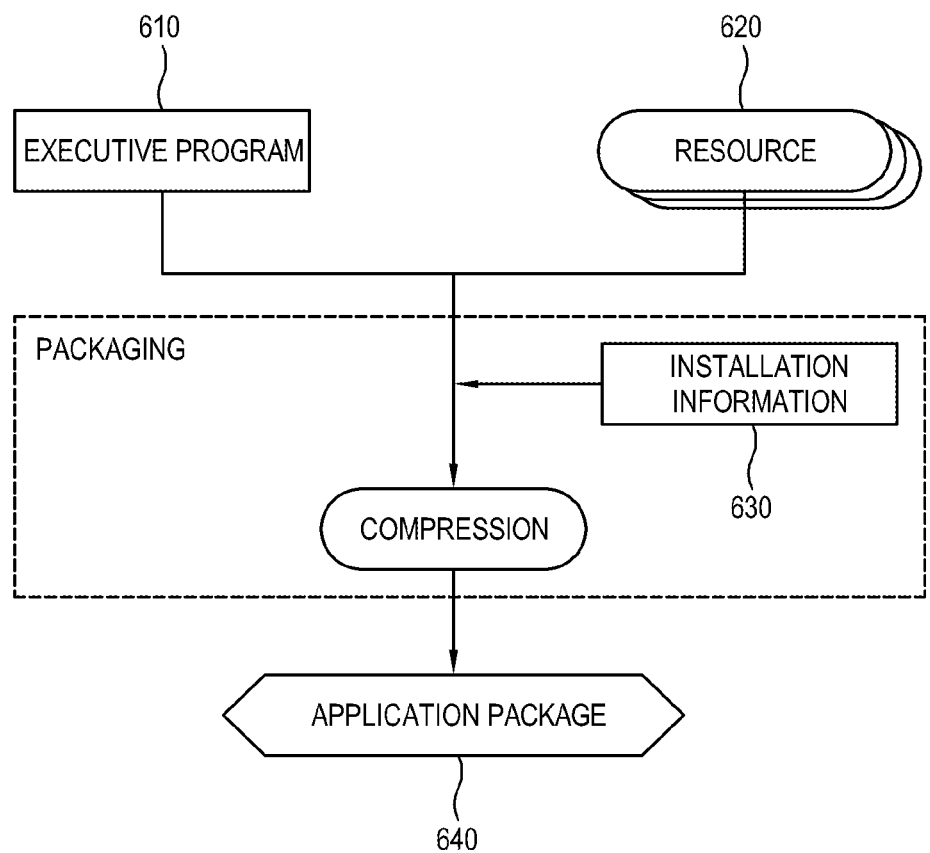
FIG. 8 is a diagram illustrating an example of producing an application package in the system of FIG. 1.

FIG. 8 is a view of producing an application package 640;

As shown in FIG. 8, a developer produces an executive program 610 of an application, and one or more resources 620.

The executive program 610 is a program code to be executed for driving the application. The executive program is necessary data for achieving the functions of the application, which includes a compiled result and a source code representatively needed for the execution. As an example of the executive program 610, there is a file of Classes.dex in the APK file.

The resource 620 is data selectively used while the executive program 610 executes the application, and may for example include an image, a moving picture, a sound, a text, a font, etc. As an example of the resource 620, there are files in an Asset and Res folders, a file of Resource.arsc in the APK file.

When the executive program 610 and the resource 620 are prepared, the developer executes the packaging operation. The packaging operation is performed in the client computer of the developer. During the packaging operation, the executive program 610, the resource 620 and the installation information 630 are integrally compressed. When the compression is completed, the application package 640 is suitable for the distribution.

By the way, the resource 620 may include additional data not intended by a developer. The representative additional data is meta-data. For example, there are JPEG file interchange format (JFIF) or exchangeable image file format (Exif) data in case of a joint photographic experts group (JPEG) format; a tExt chunk in case of a portable network graphics (PNG) format; ID3 tag in case of MP3 format, and so on. That is, the developer needs only main data of an image, a moving image, a sound, etc. of the resource 620 during a developing process, but the practical resource 620 may include not only the main data but also the meta-data. In this case, the meta-data is not concerned with and not referred to by the execution and operation of the application, and is thus unnecessary for the application.

The meta-data involved in the resource 620 is included in the application package 640 at the packaging operation, and thus increases the total size of the application package 640, thereby increasing consumption of communication resources used while distributing the application package 640, increases time to be taken in decoding the application in the display apparatus, and delaying installing and executing time in the display apparatus.

To solve the foregoing problems, a second example embodiment will be described.

Figure 9:
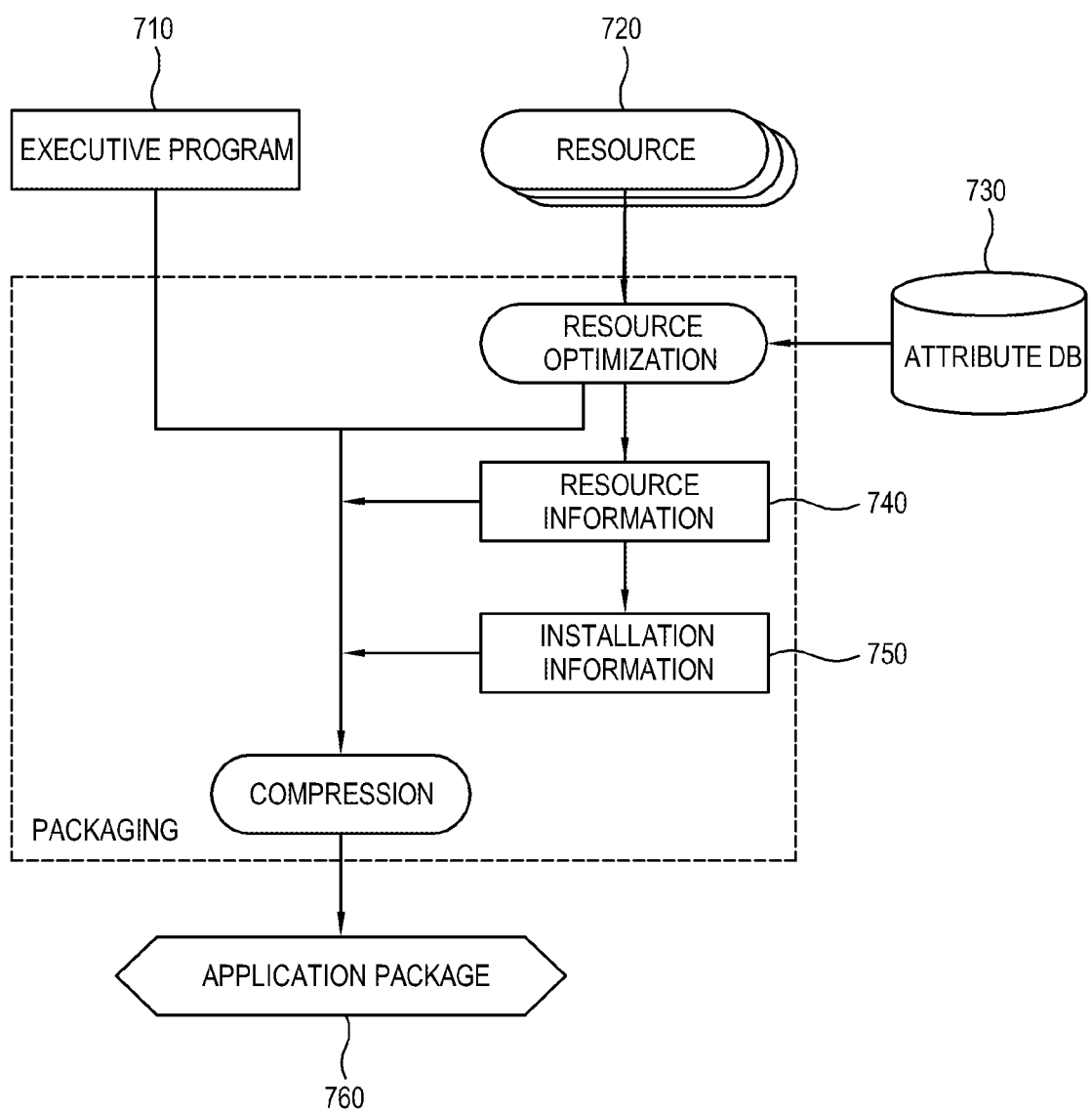
FIG. 9 is a diagram illustrating an example of producing an application package according to a second example embodiment.

FIG. 9 is a view of producing an application package 760 according to the second example embodiment.

As shown in FIG. 9, according to the second example embodiment, a developer produces an executive program 710 and one or more resources 720.

When the executive program 710 and the resources 720 are completely produced, a client computer of the developer starts the packaging operation. During the packaging operation, the client computer implements optimization of the resources 720 with reference to an attribute DB 730. When the optimization of the resources 720 is completed, the optimized resources 720 and resource information 740 corresponding to change in the resources 720 due to the optimization are obtained.

The client computer compresses the executive program 710, the optimized resources 720, the resource information 740 and installation information 750 together with one another by a preset compression format. When such a packaging operation is completed, an application package 760 is created.

On the contrary to the foregoing embodiment of FIG. 8, the optimization of the resources 720 is additionally performed based on the attribute DB 730 according to this example embodiment. By this optimization, the meta-data and the like unnecessary data are removed from the resources 720 when the application is executed, thereby decreasing the size of resources 720 and thus decreasing the size of application package 760. Further, it is also possible to reduce time to be taken in decoding the application as the size of resources 720 is decreased.

The optimization of the resources 720 is applied when the web application is produced, but hardly applied when the native application is produced. This is because the native application directly manages the resources 720. The native application directly determines how the resources 720 will be decoded or what data of the resources 720 will be used. The platform for driving the native application only delivers the resources 720 as they are in response to the request of the native application. Therefore, if the resources 720 are changed during the packaging operation of the application, an error is likely to occur in the application.

On the other hand, the web application does not directly manage the resources 720, and the platform for driving the web application manages the resources 720. That is, the web application is executed on a separate manager for managing the resources 720, i.e. on the browser program. Therefore, the web application can cope with change in the resources 720 on the contrary to the native application.

When the client computer implements the optimization of the resources 720, criteria for determining what data block, i.e., chunk of the resources 720 will be deleted and what chunk will be retained have to be previously given. These criteria are recorded in an attribute DB 730 as follows.

FIG. 10 shows the attribute DB 730.

As shown in FIG. 10, the attribute DB 730 has information about the kinds of resources, and attributes to be retained, attributes to be moved to the resource information, and attributes to be deleted among the attributes of the chunks of the respective sources.

Here, the attribute DB 730 may or may not have all the designated attributes to be retained, moved and deleted with respect to the respective resources. For example, the attribute DB 730 may designate only the attributes to be retained and moved, and designate the other attributes to be deleted. Further, the attribute DB 730 may designate only the attribute to be moved and deleted, and designate the other attributes to be retained. According to this example embodiment, the three attributes are all designated, but not limited thereto.

For example, there are IHDR, sBIT, pHYs, IDAT, IEND, tEXT, prVW, mkBF, mkTS, mkBS, mkBT, iTXt, etc. as the attributes of chunks included in a PNG image file. Such names of the attributes have been defined in the PNG standards, and therefore detailed descriptions thereof will be avoided as necessary. Among them, IHDR of an image header, IDAT of image data, and TEND for an image trailer are essential for the PNG image, but tEXT, iTXt and the like related to a text are an auxiliary chunk. Further, prVW, mkBF, etc. are unnecessary chunks in producing the application.

In the attribute DB 730, it is previously determined whether the chunks are necessary for operating the application and then the chunks are designated according to their determined attributes. In the case of the PNG image resource, the chunks of the attributes such as IHDR, sBIT, pHYs, IDAT and IEND are retained in the source as they are; the chunk of the attribute such as tEXT is deleted from the resource but its contents are added to the resource information; and the chunks of the attributes such as prVW, mkBF, mkTS, mkBS, mkBT and iTXt are deleted from the resource and their contents are not added to the resource information.

Here, the attributes deleted from the resource and added to the resource information may be determined in accordance with various factors. The attributes added to the resource information may be designated when they are expected to be not needed when the application is executed but be needed for reference in the future. In the case of the image resource, a text chunk in which information related to image data is recorded may have such an attribute. That is, only the image data is needed when an actual application is executed, but information related to the image data may be also needed in other situations than the execution of the application. To this end, the contents of the corresponding chunk may be conserved as the resource information. However, this is nothing but an example.

In this example embodiment, only the case of the PNG image resource was described, but not limited thereto. Alternatively, the attribute DB 730 may be constructed by applying the same principle to various resources such as a JPEG image resource, a MP3 sound resource, etc.

Figure 11:
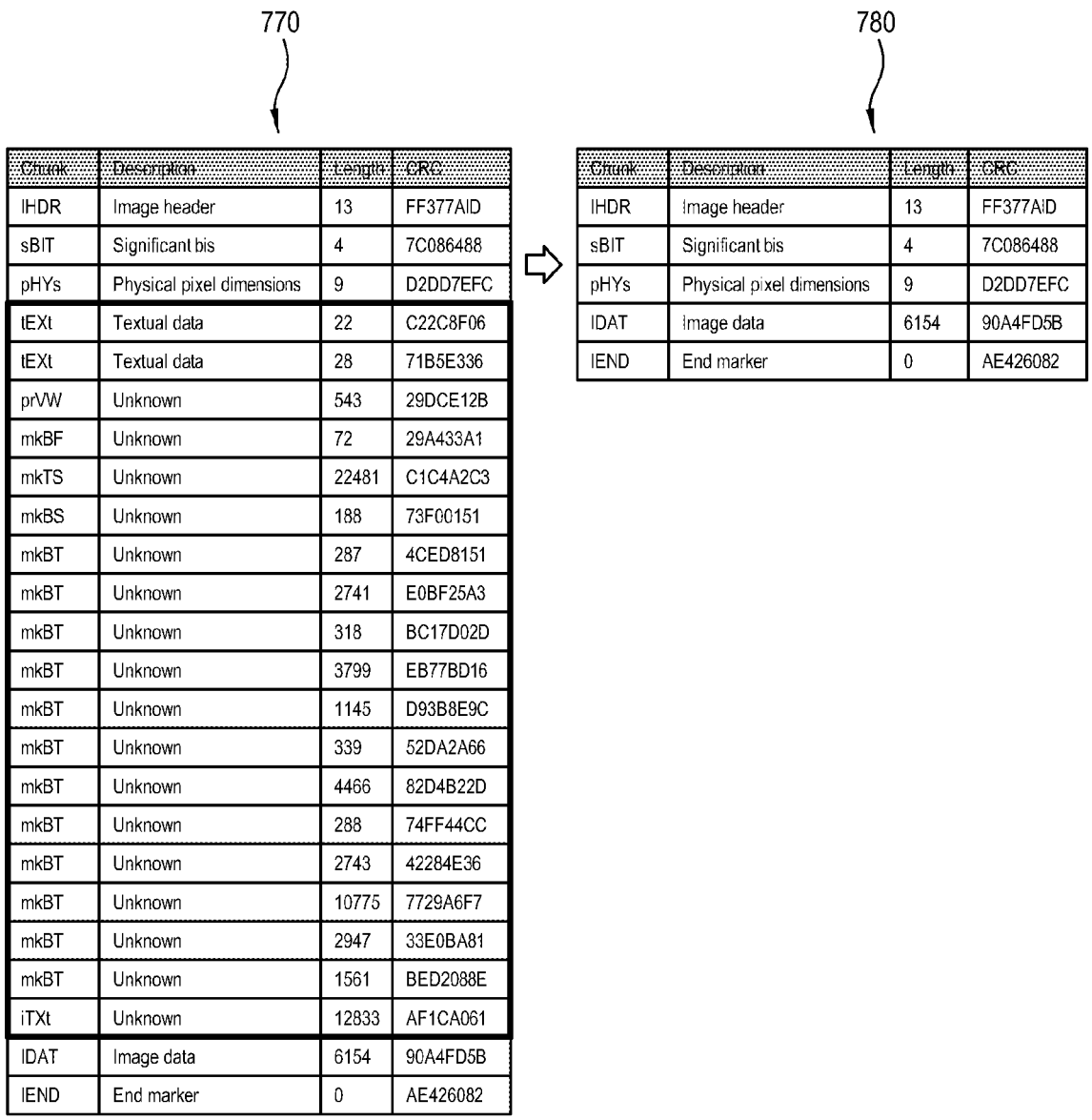
FIG. 11 is a diagram illustrating an example chunk list obtained by analyzing a certain resource of a portable network graphics (PNG) image according to the second example embodiment.

FIG. 11 is a view of a chunk list 770 obtained by analyzing a certain resource of a portable network graphics (PNG) image according to the second example embodiment;

As shown in FIG. 11, the client computer implements optimization for a resource based on the contents of the attribute DB designated to the respective resources. For example, the client computer analyzes the attributes of the respective chunks in a certain resource of the PNG image, and makes a chunk list 770 as shown in the left side of FIG. 11. The chunk list 770 includes the attributes corresponding to the chunks, and the brief descriptions, the length and CRC of the corresponding attributes.

Among the chunks of the chunk list 770, the client computer retains the chunks corresponding to the attributes such as IHDR, sBIT, pHYs, IDAT and IEND, and deletes the chunks corresponding to the attributes such as tEXT, prVW, mkBF, mkTS, mkBS, mkBT and iTXt as defined in the attribute DB. Further, among the deleted chunks, the client computer adds the contents of the chunk corresponding to the attribute of tEXT to the resource information As several chunks are deleted from the PNG resource, a chunk list 780 is made as shown in the right side of FIG. 11. In comparison between the chunk list 770 before the optimization and the chunk list 780 after the optimization, it will be appreciated that the latter is significantly more decreased in a data amount of resources than the former. The client computer implements the optimization based on the foregoing principle with regard to not only the PNG but also all the resources, and makes the application package with the optimized resource.

Below, operations of producing and distributing an application will be described.

Figure 12:
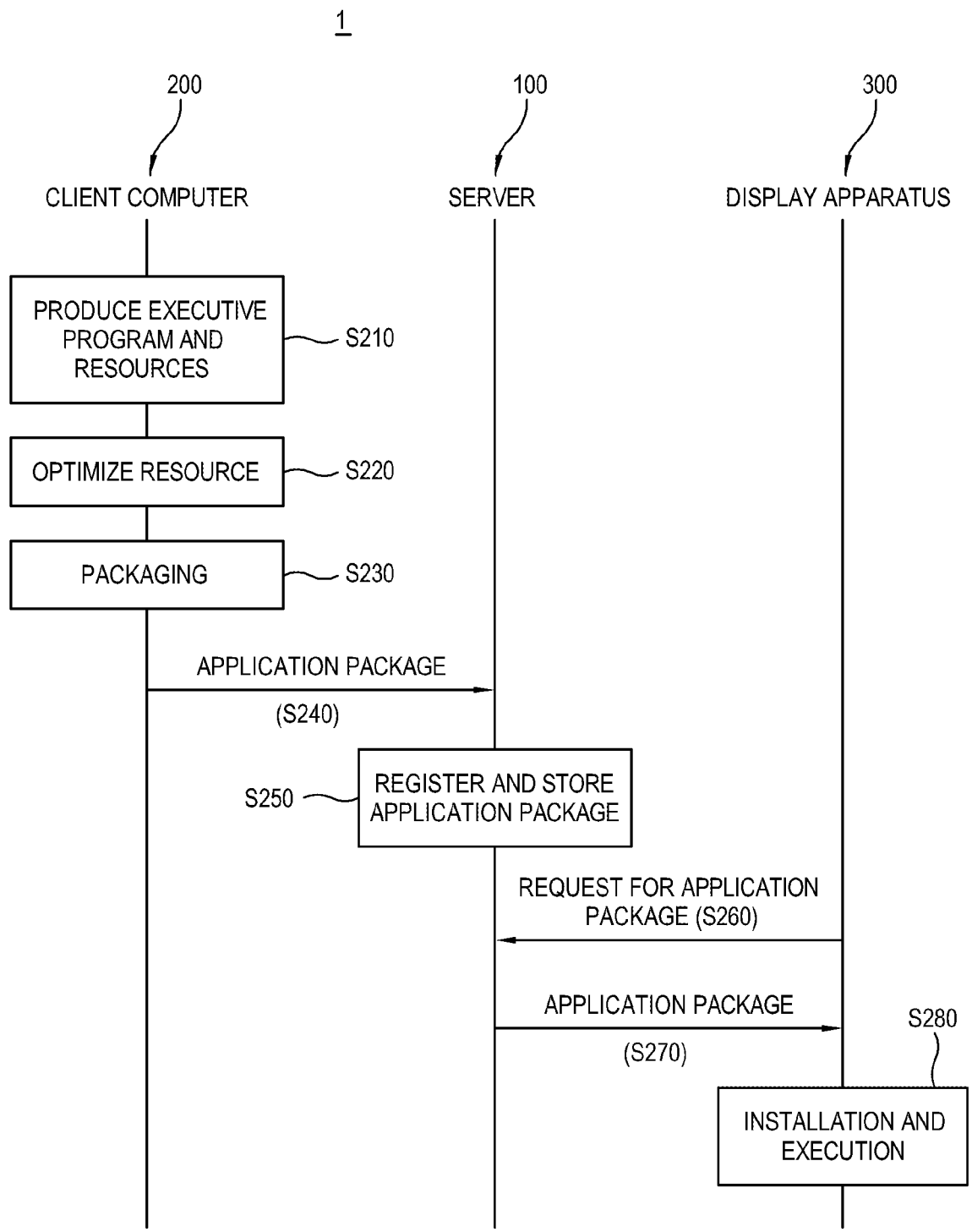
FIG. 12 is a flowchart illustrating an example of producing and distributing an application in a system according to the second example embodiment.

FIG. 12 is a flowchart of producing and distributing an application in a system 1 according to the second example embodiment. In this embodiment, the server 100, the client computer 200 and the display apparatus 300 have the same basic structures as described above.

As shown in FIG. 12, at operation S210 the client computer 200 produces an executive program necessary for driving an application, and resources selectively called and used by the executive program.

At operation S220, the client computer 200 implements the optimization for the resources. The optimization for the resources is the same as described above Thus, the resources are optimized, and the resource information is created. Here, the resource information may be not created in accordance with the methods of optimizing the resources.

At operation S230, the client computer 200 packages the executive program and the resources together with the installation information, thereby making the application package. If the resource information is created in the foregoing operation S220, the client computer 200 adds the resource information to the application package.

At operation S240 the client computer 200 sends the application package to the server 100.

At operation S250 the server 100 registers and stores the application package received from the client computer 200.

At operation S260 the server 100 receives a request for the application package from the display apparatus 300. Thus, at operation S270 the server 100 sends the application package corresponding to the request to the display apparatus 300.

At operation S280 the display apparatus 300 restores the executive program, the resource and the installation information from the application package received from the server 100, and installs and executes an application on an operating system in accordance with the installation information.

However, the resource information is unnecessary for executing the application, and therefore the display apparatus 300 does not decode the resource information while executing the application. If it is determined in the future that the resource information is necessary, the display apparatus 300 will decode the resource information.

Since the optimized resources are installed and decode, time to be taken in decoding and installing in the display apparatus according to this example embodiment is significantly shorter than that of the first example embodiment.

If the meta-data deleted from the resources while optimizing the resources in the operation S220 is directly added to the resource information, it is regarded that the meta-data is moved from the resource to the resource information and therefore there is no change with respect to the whole size of application package. When the application is executed in the display apparatus 300, the resources are decoded without decoding the resource information, thereby shortening the time taken in decoding.

Below, operations of producing the application package by the client computer will be described.

Figure 13:
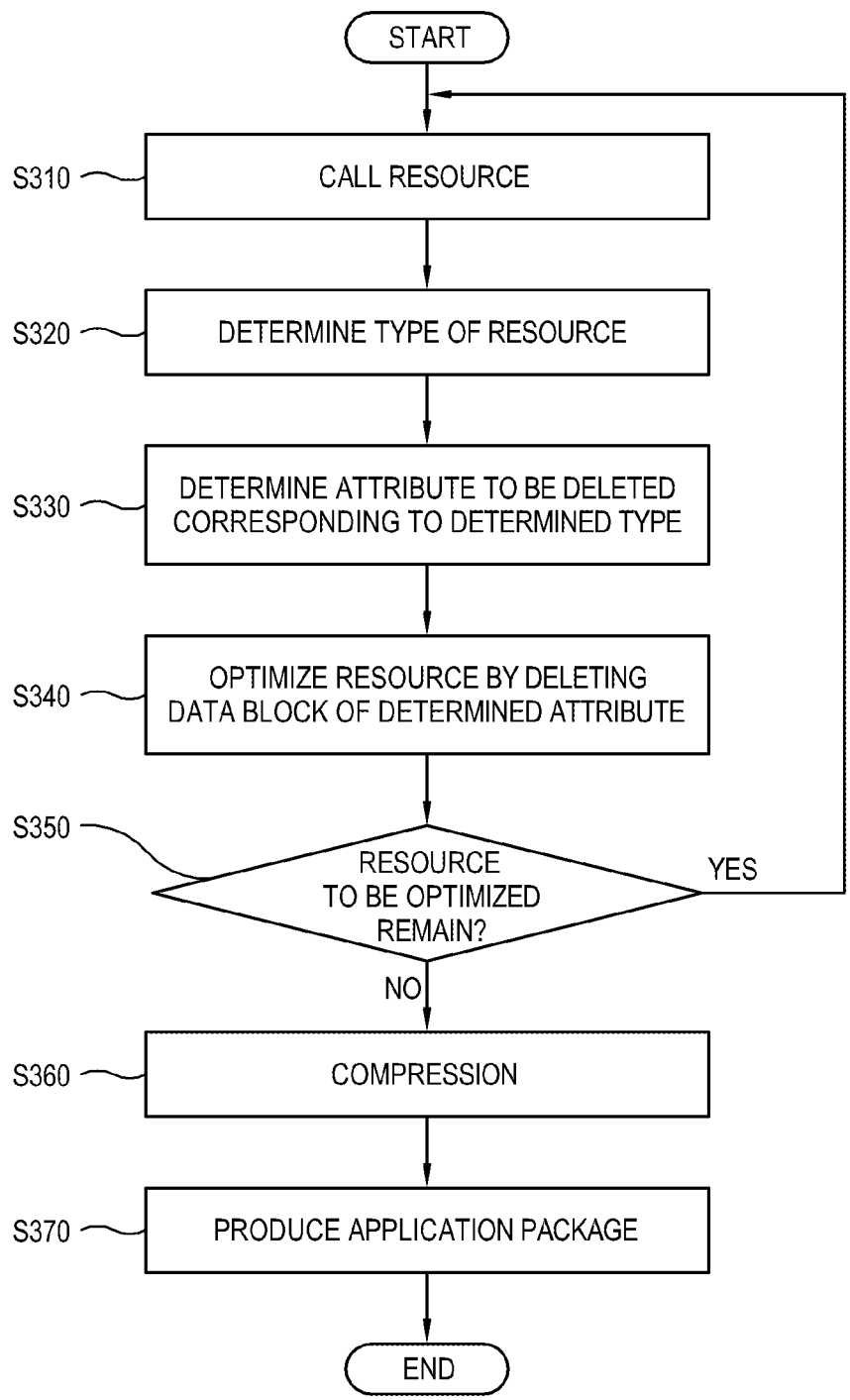
FIG. 13 is a flowchart illustrating that a client computer produces the application package according to the second example embodiment.

FIG. 13 is a flowchart that a client computer produces the application package according to the second example embodiment.

As shown in FIG. 13, at operation S310 the client computer calls the resource provided for producing the application. Here, the resources include one or more chunks, i.e. data blocks individually having attributes.

At operation S320 the client computer determines the types of resources. The types of resources may be determined based on a filename extension of the resource or meta information recorded in a header of the resources.

At operation S330 the client computer determines the attributes to be deleted corresponding to the determined types. This determination is based on the previously established attribute DB.

At operation S340 the client computer optimizes the resources by deleting the data blocks corresponding to the determined attributes from the resources. If necessary, the client computer may make new resource information with the contents of the deleted data blocks.

At operation S350 the client computer determines whether resources to be optimized still remain. If there are resources to be optimized, the client computer returns to the operation S310. Otherwise, the client computer enters the operation S360.

At operation S360 the client computer compresses the optimized resources together with the executive program and the installation information. If the resource information is created in the foregoing operation S340, the client computer adds the resource information to the compression.

At operation S370 the client computer completes the compression to thereby create the application package.

In the example embodiments, the additional data unnecessary for achieving the application is deleted from the resource. However, the method of optimizing the resource is not limited to the foregoing embodiments. Below, another method of optimizing the resource will be described.

Figure 14:
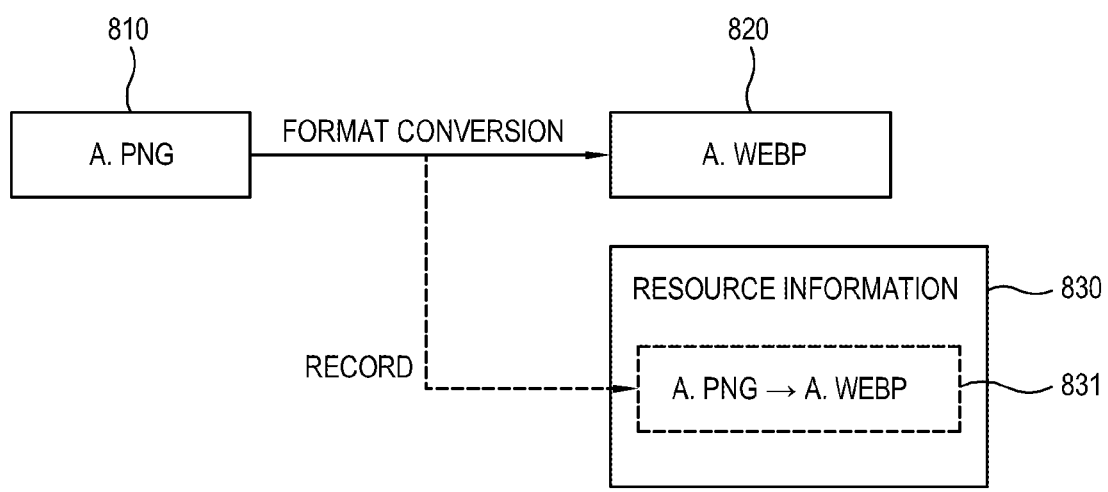
FIG. 14 is a diagram illustrating a principle of optimizing a resource according to a third example embodiment.

FIG. 14 is a view showing a principle of optimizing a resource according to a third example embodiment.

As shown in FIG. 14, a client computer according to the third example embodiment may convert the formats of the resources in order to optimize the resources. The converted formats may be selected to be more efficient in terms of reducing the size of resources.

For example, if there is a resource 810 having a filename of 'A.PNG' corresponding to a PNG image format, the PNG image format may be replaced by a WEBP image format having a higher efficiency in terms of size and decoding speed.

The WEBP image format is an image format developed by Google in 2011 to replace the JPEG format. The WEBP has been proposed for the purpose of traffic reduction and fast loading speed and of a web site, and has been known as it is highly effective on compressing a photo image. The WEBP is a loss compression format like the JPEG, etc. and reduces a file size while minimizing degradation of image quality. Further, the WEEP has been proposed to support a lossless compression format in 2012 and thus replaced the PNG or the like lossless compression format. The WEBP employs VP8 video codec based on WebM of a multimedia format with respect to video compression, and uses a resource interchange file format (RIFF) of a container format.

The client computer converts a resource 810 of the PNG format into a resource 820 of the WEBP format, thereby optimizing the resources. In this process, the file name of the optimized resource 820 is changed from A.PNG to A.WEBP. Such an optimization method of changing PNG into WEBP is nothing but an example, and does not limit the present disclosure. Alternatively, any format employed in the optimization may be replaced as long as it can be relatively effective in terms of size and decoding speed.

By the way, the file name is changed in the process of converting the format, and therefore the client computer records a history 831 that the file name is changed from A.PNG to A.WEBP for the optimization of the resource 810 in the resource information 830. If the history 831 is not recorded, an error occurs in the future when the application is executed in the display apparatus.

The client computer makes the application package while optimizing the resource. Regarding the distribution of the application, the other methods than the optimization of the resource are the same as described above, and thus repetitive descriptions thereof will be avoided as necessary.

Figure 15:
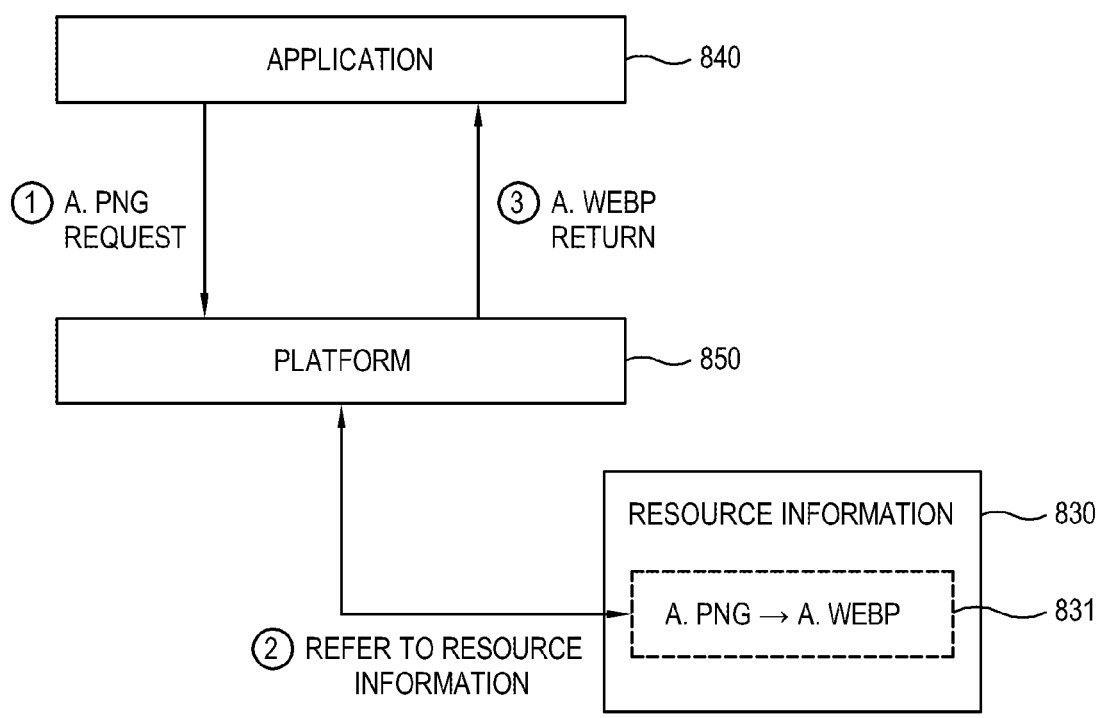
FIG. 15 is a diagram illustrating a principle of executing an application in the display apparatus according to the third example embodiment.

FIG. 15 is a view showing a principle of executing an application in the display apparatus according to the third example embodiment;

As shown in FIG. 15, the display apparatus installs and executes an application 840 on a platform 850. While the application 840 is executed on the platform 850 of the display apparatus, the application 840 may make a request for the resource named 'A.PNG' to the platform 850.

The platform 850 retrieves the resources corresponding to the request of the application 840. However, the resource named 'A.PNG' does not exist in the application package after the optimization process as shown in FIG. 14. Therefore, the platform 850 retrieves the history 831 related to the resource named 'A.PNG from the resource information 830. If the resource information 830 has not been decoded, the platform 850 decodes the resource information 830 and then performs retrieving.

If the platform 850 retrieves the history 831 related to change from 'A.PNG' into 'A.WEBP' from the resource information 830, the platform 850 retrieves a resource named 'A.WEBP' in accordance with the history 831. The platform 850 returns the retrieved resource to the application 840.

If the history 831 has not been recorded in the resource information 830, the platform 850 cannot return the resource named 'A.WEBP' to the application 840 and thus an error occurs in executing the application 840. Accordingly, if the file name of the resource is changed due to the optimization of the resource, the resource information recording the history of the change is essential.

In the foregoing example embodiment, the resource of the image format was described, but not limited thereto. Alternatively, the present disclosure may be applied to the resources of various formats such as an audio format, a moving image format, etc.

FIG. 16 is a view of an attribute DB 860 according to the third example embodiment.

As shown in FIG. 16, the client computer converts the format of the resource to be optimized based on the attribute DB 860. In the attribute DB 860, the types of the resources, the current formats of the resources, and the formats into which the resources will be converted are designated.

For example, if it is determined that the resource has the PNG image format, the client computer searches the attribute DB 860 for information of converting the PNG format into the WEBP format. Based on the retrieved information, the client computer converts the resource to have the WEBP format.

Further, if the client computer is determined that the resource has a free lossless audio codec (FLAC) format, the client computer searches the attribute DB 860 for information of converting the FLAC format into an OGG format.

Below, optimization of the resource according to an example embodiment will be described.

Figure 17:
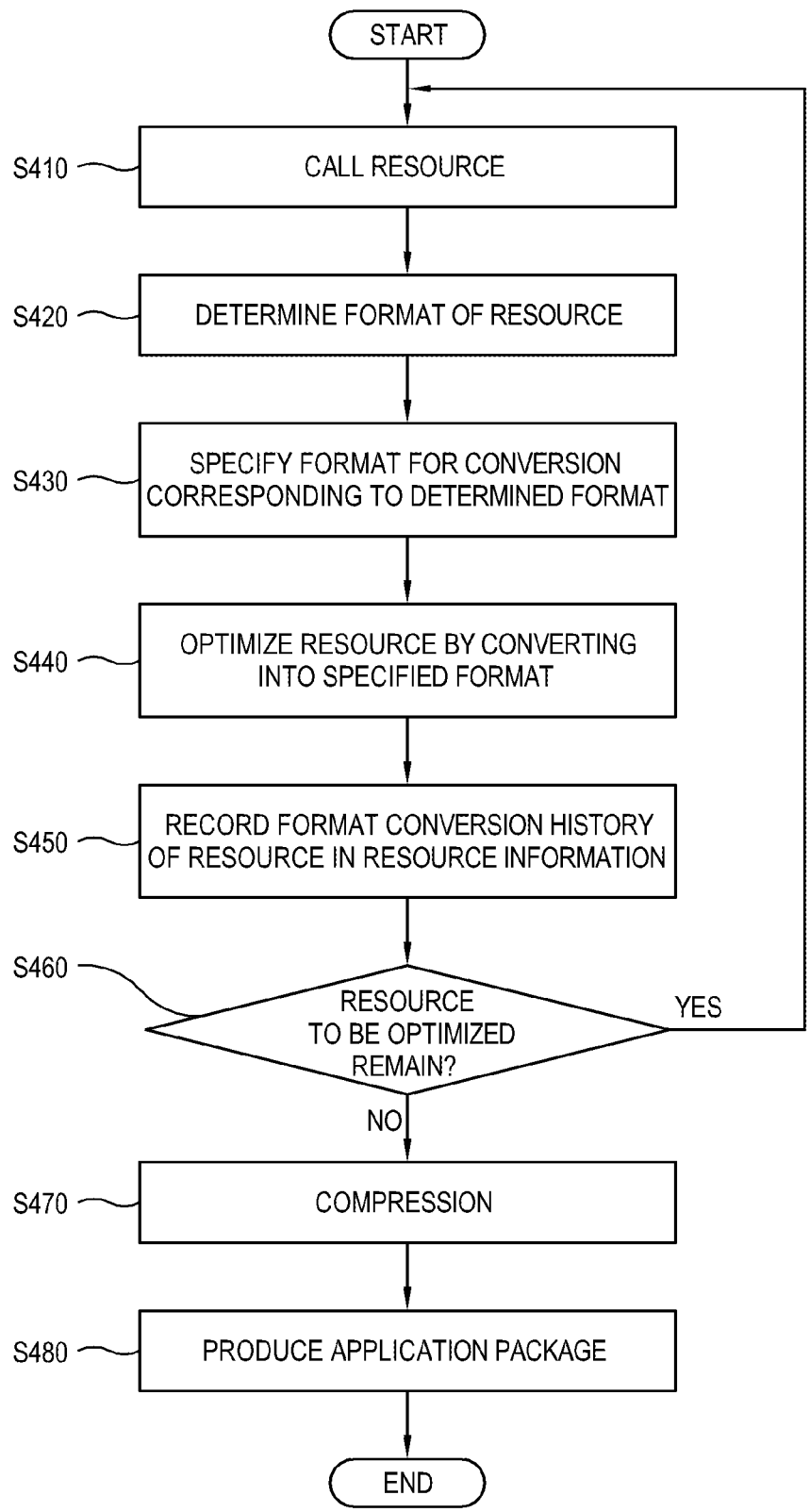
FIG. 17 is a flowchart illustrating that the client computer optimizes a resource according to the third example embodiment.

FIG. 17 is a flowchart that the client computer optimizes a resource according to the third example embodiment As shown in FIG. 17, at operation S410 the client computer calls a certain resource provided for producing an application.

At operation S420 the client computer determines the format of the called resource.

At operation S430 the client computer specifies a conversion format designated corresponding to the determined format. The conversion format is specified as described above with reference to FIG. 16.

At operation S440 the client computer converts the resource to have the specified conversion format, thereby optimizing the resources.

At operation S450 the client computer records a history of converting the format of the resource in the resource information.

At operation S460 the client computer determines whether resources to be optimized still remain. If there are resources to be optimized, the client computer returns to the operation S410. Otherwise, the client computer enters the operation S470.

At operation S470 the client computer compresses an executive program, the optimized resource, installation information and resource information all together.

At operation S480 the client computer completes the compression to thereby create the application package.

Figure 18:
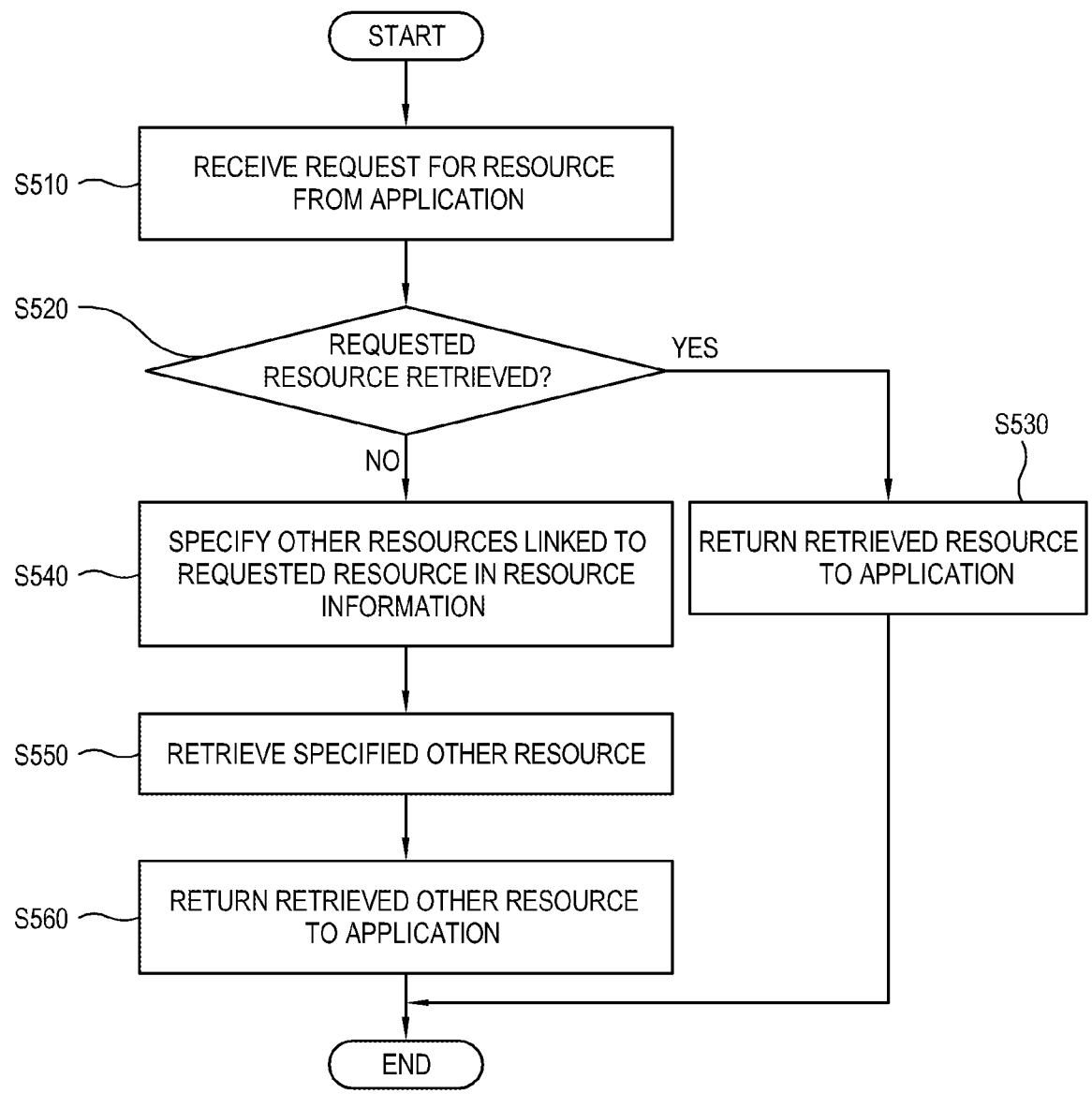
FIG. 18 is a flowchart illustrating that a platform retrieves a resource requested by the application in the display apparatus according to the third example embodiment.

FIG. 18 is a flowchart that a platform retrieves a resource requested by the application in the display apparatus according to the third example embodiment As shown in FIG. 18, at operation S510 a certain resource is requested to the platform of the display apparatus by the application.

At operation S520 the platform determines whether the requested resource is retrieved among the resources installed in the display apparatus.

If the requested resource is retrieved, at operation S530 the platform returns the retrieved resource to the application.

On the other hand, if the requested resource is not retrieved, at operation S540 the platform retrieves and specifies another resource linked to the requested resource, i.e. other resources prepared instead of the requested resource from the resource information.

At operation S550 the platform retrieves another specified resource based on the resource information.

At operation S560 the platform returns the retrieved resource to the application.

Below, other methods of optimizing the resources, different from the methods of the foregoing embodiments, will be described.

Figure 19:
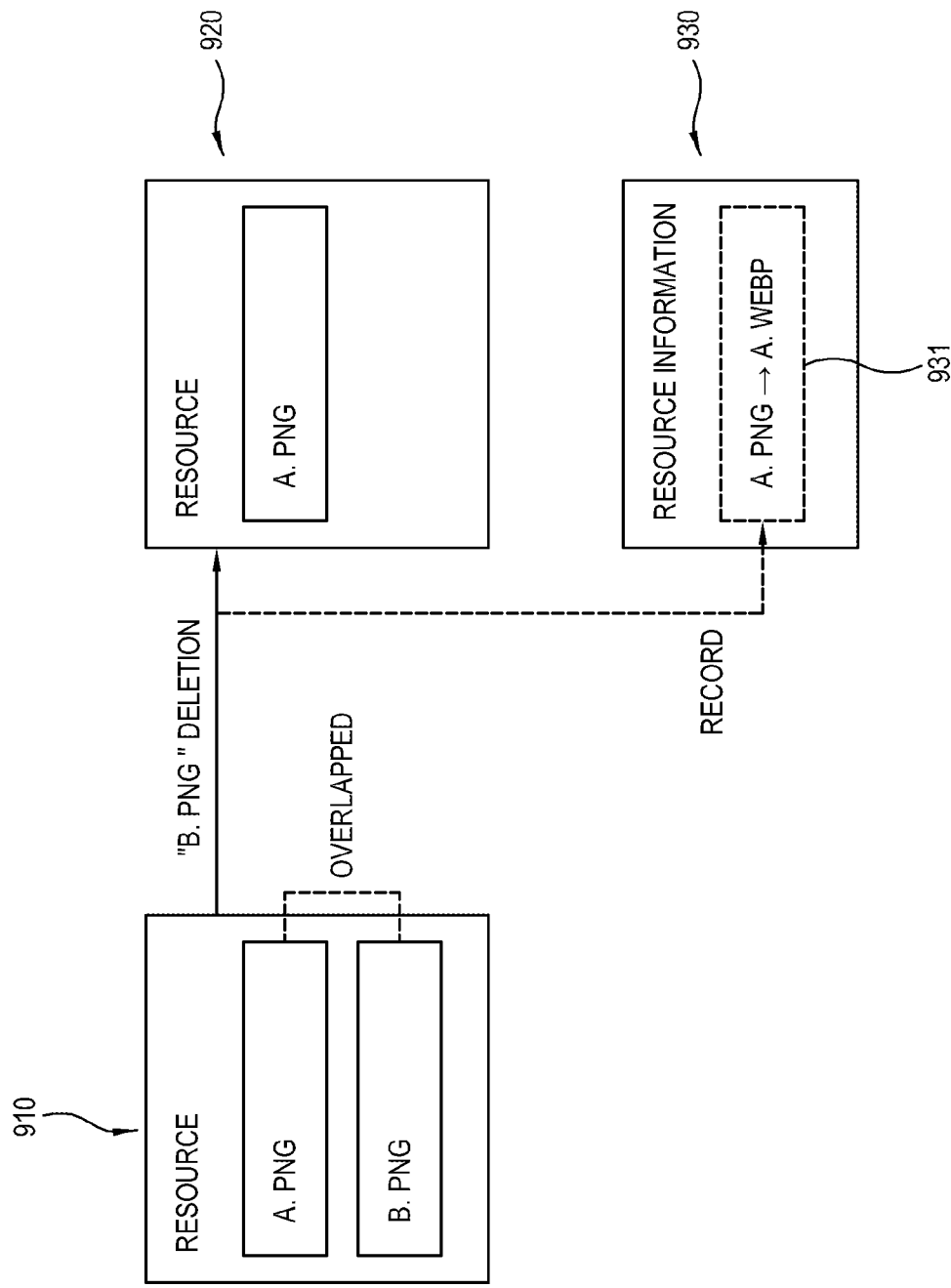
FIG. 19 is a diagram illustrating an example method of optimizing a resource according to a fourth example embodiment.

FIG. 19 is a view of a method of optimizing a resource according to a fourth example embodiment.

As shown in FIG. 19, the client computer according to the fourth example embodiment retrieves redundant resources among all the resources 910 when the resources are optimized. Since various methods of retrieving the redundant resources are possible, detailed descriptions thereof will be omitted.

For example, suppose that the resource named 'A.PNG' and the resource named 'B.PN' are different in the name but have the same contents. In this case, the client computer deletes one of the two duplicated resources, e.g. the resource named 'B.PNG' and retains the resource named 'A.PNG'. Thus, the client computer creates the optimized resources 920 from which the redundant resource named 'B.PNG' is deleted.

In this process, the client computer controls the resource information 930 to record therein link information 931 that the deleted B.PNG is replaceable by A.PNG. If the link information 931 is not recorded in the resource information 930, an error occurs when the application is executed making a request for B.PNG to the platform.

In this embodiment, when there two overlapped resources, one of them is deleted. If three or more resources are overlapped, the client computer retains only one of them and deletes the others.

Figure 20:
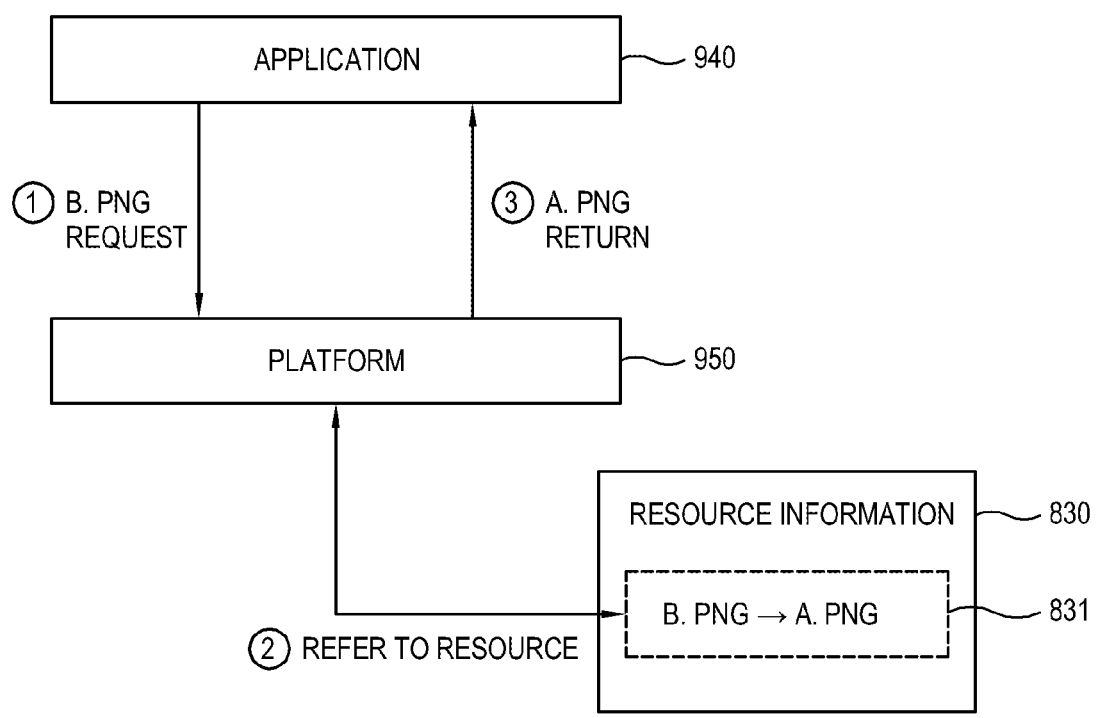
FIG. 20 is a diagram illustrating a principle of executing an application in a display apparatus according to the fourth example embodiment.

FIG. 20 is a view showing a principle of executing an application in a display apparatus according to the fourth example embodiment.

As shown in FIG. 20, the display apparatus installs and executes an application 940 on a platform 950. While the application 940 is executed on the platform 950 of the display apparatus, the application 940 makes a request for a resource named 'B.PNG' to the platform 950.

The platform 950 retrieves the resource corresponding to the request of the application 940. However, there are no resources named 'B.PNG' in the application package due to the foregoing optimization process as shown in FIG. 19. Thus, the platform 950 retrieves information 931 about a resource liked to the resource named 'B.PNG' from the resource information 930. If the resource information 930 has not been decoded, the platform 950 decodes the resource information 930 and then performs the retrieving.

If the information 931 that the resource linked to 'B.PNG' is equal to the resource named 'A.PNG' is retrieved from the resource information 930, the platform 950 retrieves not the resource named 'B.PNG' but the resource named 'A.PNG' based on the corresponding information 931. The platform 950 returns the retrieved resource to the application 940.

If the information 931 has not been recorded in the resource information 930, the platform 950 cannot return the resource named 'A.PNG' to the application 940 and thus an error occurs in execution of the application 940. Therefore, if the redundant resource is deleted due to the optimization of the resources, the resource information where the resource for replacing the deleted resource is specified is essential.

In the foregoing example embodiment, the resource of the image format was described, but not limited thereto. Alternatively, the disclosure concept may be applied to the resources of various formats such as an audio format, a moving image format, etc.

Below, operations of optimizing of the resources according to this example embodiment will be described.

Figure 21:
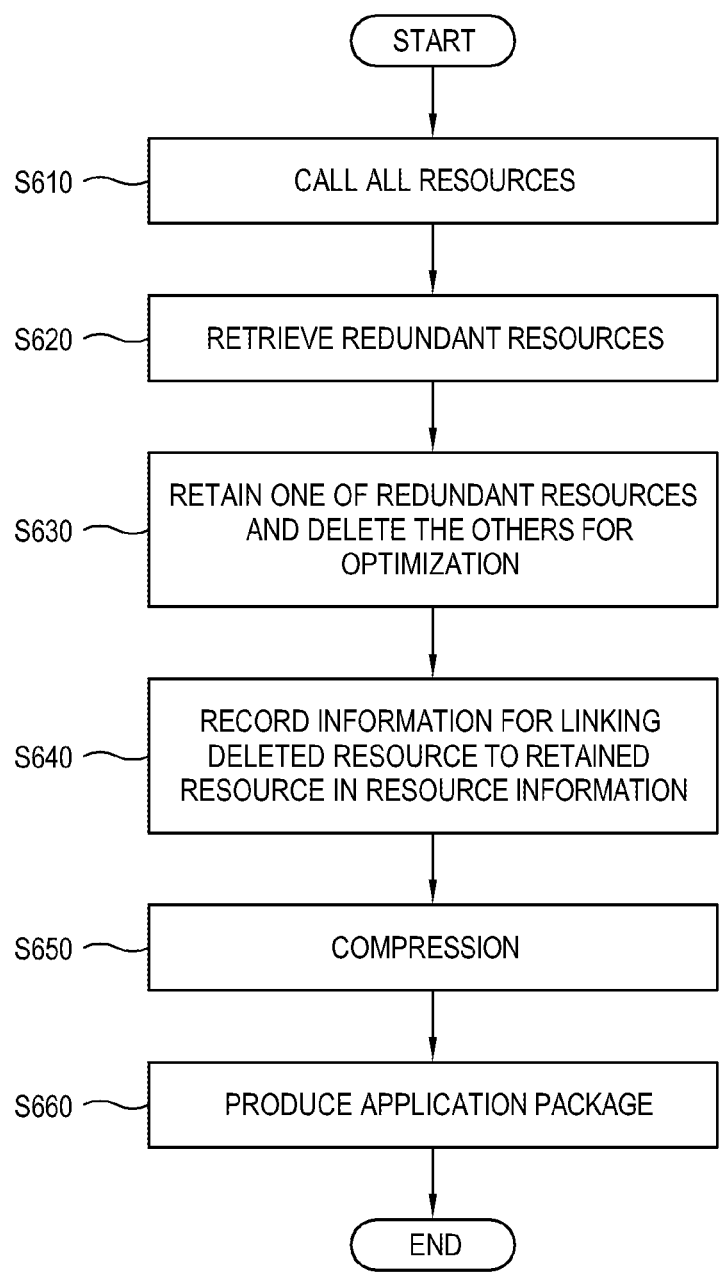
FIG. 21 is a flowchart illustrating that a client computer optimizes a resource according to the fourth example embodiment.

FIG. 21 is a flowchart that a client computer optimizes a resource according to the fourth example embodiment.

As shown in FIG. 21, at operation S610 the client computer calls all the resources prepared for producing an application.

At operation S620 the client computer retrieves the redundant resources from all the resources.

At operation S630 the client computer retains only one of the redundant resources and deletes the other resources, thereby optimizing the resources.

At operation S640 the client computer records information, where the deleted resource is linked to the retained resource, in the resource information.

At operation S650 the client computer compresses an executive program, the optimized resources, installation information and the resource information all together.

At operation S660 the client computer completes the compression to thereby create the application package.

Figure 22:
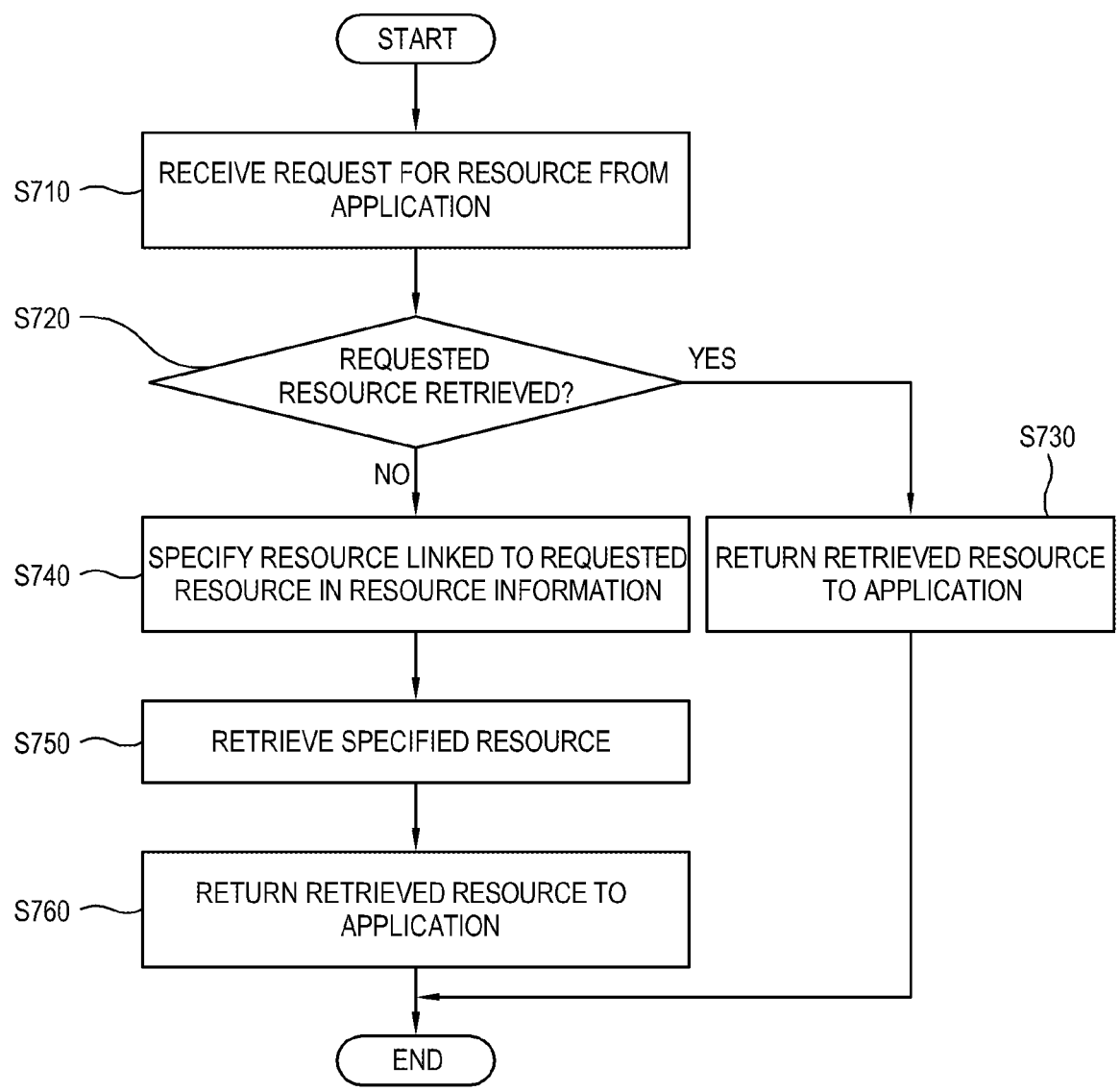
FIG. 22 is a flowchart illustrating that a platform retrieves a resource requested by the application in the display apparatus according to the fourth example embodiment.

FIG. 22 is a flowchart that a platform retrieves a resource requested by the application in the display apparatus according to the fourth example embodiment.

As shown in FIG. 22, at operation S710 a resource is requested to the platform of the display apparatus by the application.

At operation S720 the platform determines whether the requested resource is retrieved among the resources installed in the display apparatus.

If the requested resource is retrieved, at operation S730 the platform returns the retrieved resource to the application.

On the other hand, if the requested resource is not retrieved, at operation S740 the platform retrieves and specifies what resources are linked to the requested resource, from the resource information.

At operation S750 the platform retrieves the specified resource based on the resource information.

At operation S760 the platform returns the retrieved resource to the application.

Figure 23:
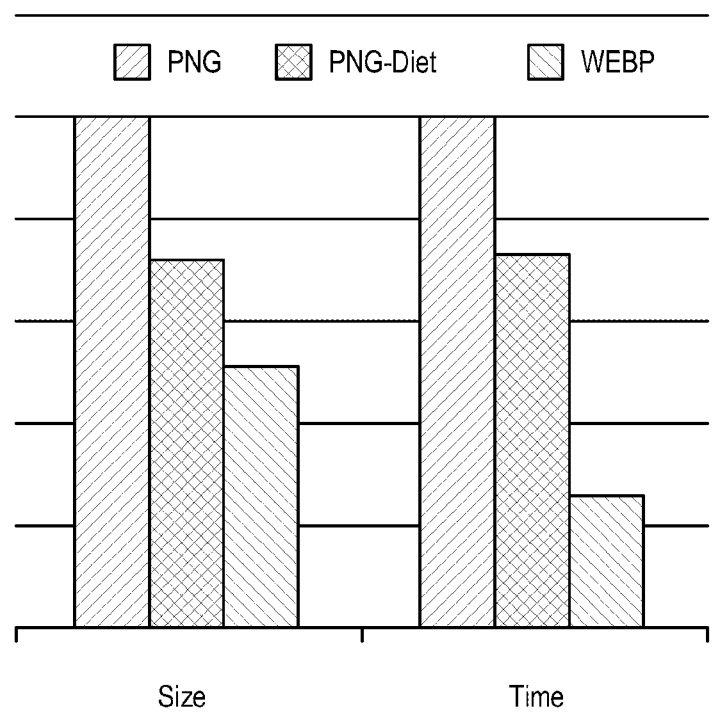
FIG. 23 is a graph illustrating example effects of resource optimization in an application package.

FIG. 23 is a graph showing effects of resource optimization in an application package;

Referring to FIG. 23, the effects of the resource optimization were tested with respect to resource files of 180 PNG images. In result, time taken in decoding was shortened in proportion to reduction in the size of resource file. In the graph of FIG. 23, 'PNG' refers to a case that no optimization is applied to the resource files of the PNG images, 'PNG-Diet' refers a case that the unnecessary meta-data is deleted from the resource file, and 'WEBP' refers to a case that the resource files are converted from the PNG format to the WEBP format. Further, conditions for test environments and axis of ordinates are not specified and described herein since the graph of FIG. 23 is just given for comparison between the respective cases.

While the resource not optimized has a size of 1,096 kB and needs a decoding time of 312 ms, the resource from which the meta-data is deleted has a size of 792 kB and needs a decoding time of 230 ms. Further, the resource converted to have the WEBP format has a size of 568 kB and needs a decoding time of 83 ms. That is, it will be appreciated that the case of conversion to the WEBP format is more improved in size by about 30% and decoding speed by about 60% than the case of deleting the meta-data.

However, in the case of conversion to the WEBP format, there were five resources, which were worsened rather than improved in size and decoding speed, among total 180 resources. This means that an algorithm of the PNG format may be more proper than an algorithm of the WEBP format in accordance with the contents of the resources. In other words, the optimization is not always achieved by conversion to a format known to be more efficient.

In the foregoing example embodiments, the client computer creates the application package and registers it to the server, and the server distributes the application package to the display apparatus. That is, in the foregoing example embodiments, both the optimization of the resources and the packaging operation of the application are performed in the client computer of the developer, but not limited thereto.

Alternatively, the packaging operation of the application may be performed in the server, and the optimization of the resource may be implemented in the server or the display apparatus. Below, such example embodiments will be described.

Figure 24:
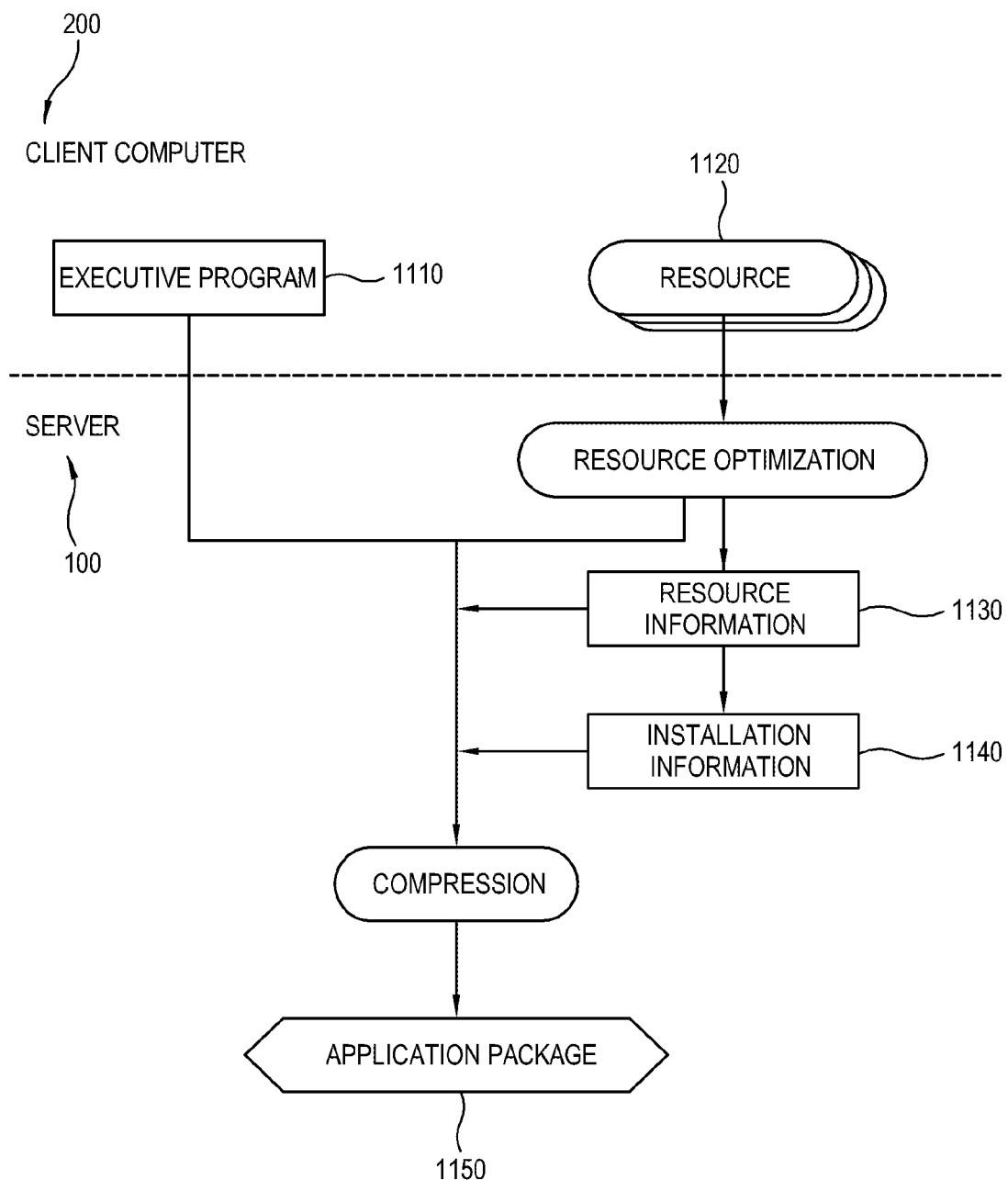
FIG. 24 is a diagram illustrating producing an application package according to a fifth example embodiment.

FIG. 24 is a view of producing an application package 1150 according to a fifth example embodiment.

As shown in FIG. 24, the client computer 200 according to the fifth example embodiment makes an executive program 1110 and one or more resources 1120 in order to produce an application. Here, the client computer 200 transmits the executive program 1110 and the resource 1120 to the server 100 as they are.

Then, the server 100 receives the executive program 1110 and the resource 1120 from the client computer 200, and optimizes the resource 1120. The optimization of the resource is the same as those described above in the foregoing example embodiments, and thus repetitive descriptions thereof will be avoided. If the optimization of the resource is completed, the optimized resource 1120 and the resource information 1130 are created.

The server 100 compresses the executive program 1110, the optimized resource 1120, installation information 1140 and the resource information 1130 all together to thereby create the application package 1150.

Below, operations of producing and distributing the application according to this example embodiment will be described.

Figure 25:
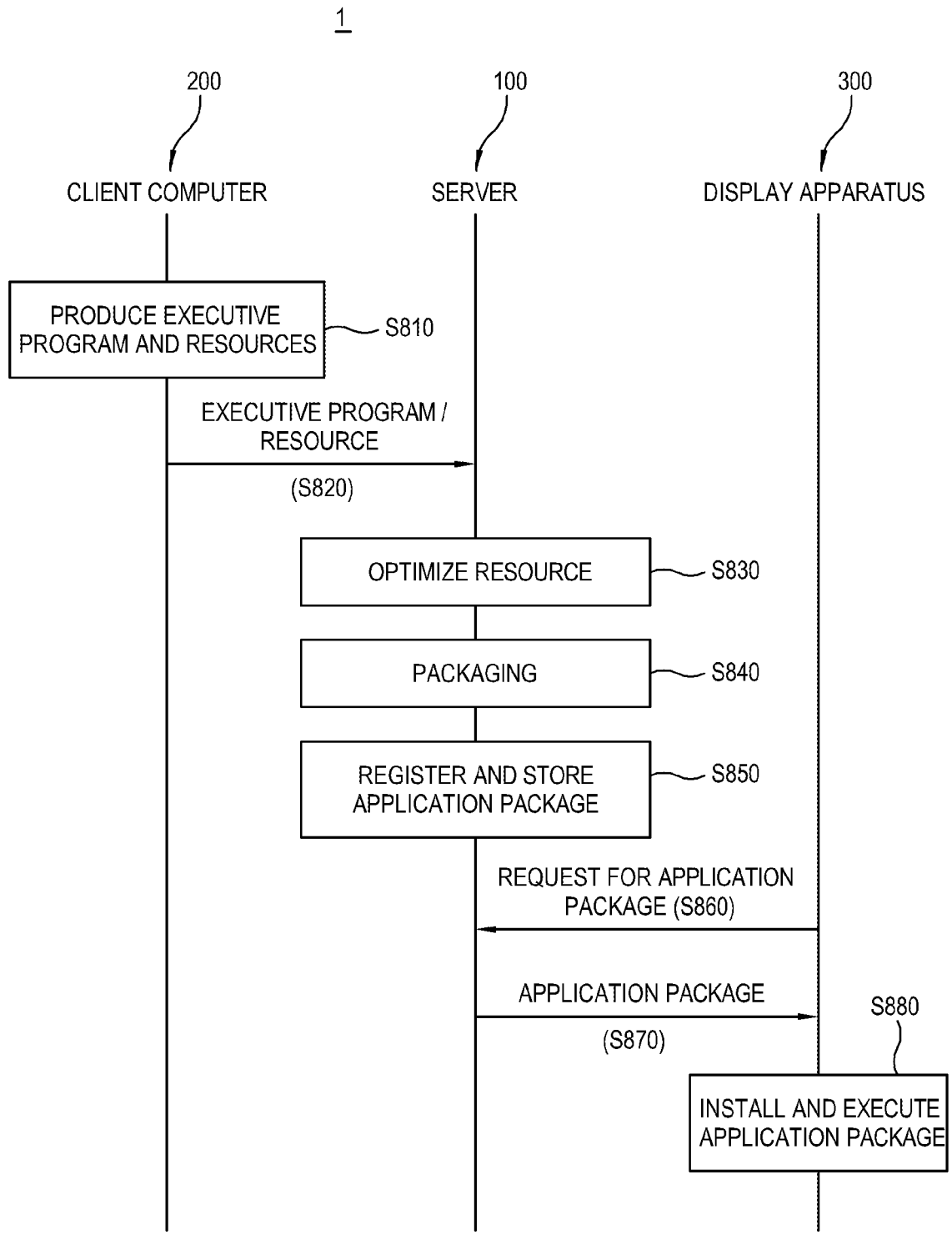
FIG. 25 is a flowchart illustrating producing and distributing an application in a system according to the fifth example embodiment.

FIG. 25 is a flowchart of producing and distributing an application in a system 1 according to the fifth example embodiment. In this embodiment, the server 100, the client computer 200 and the display apparatus 300 have the same basic structures as those described in the foregoing example embodiments.

As shown in FIG. 25, at operation S810 the client computer 200 produces the executive program essential for driving the application, and the resources selectively called and used by the executive program.

At operation S820 the client computer 200 sends the executive program and the resources to the server 100.

At operation S830 the server 100 optimizes the resources received from the client computer 200. The optimization of the resource is the same as described above. In result, the resource is optimized and the resource information is created. In accordance with the methods of optimizing the resource, the resource information may be not created.

At operation S840, the server 100 packages the executive program received from the client computer 200, the optimized resource, and the installation information all together, thereby making the application package. If the resource information is created in the operation S830, the client computer 200 adds the resource information to the application package.

At operation S850 the server 100 registers and stores the created application package.

At operation S860 the server 100 receives a request for the application package from the display apparatus 300. At operation S870 the server 100 transmits the application package corresponding to the request to the display apparatus 300.

At operation S880 the display apparatus 300 decompresses the application package received from the server 100 to thereby restore the executive program, the resource and the installation information, and installs and executes the application on the operating system in accordance with the installation information.

Therefore, according to this example embodiment, the operation of optimizing the resource and the operation of packaging the application are implemented in the server 100.

Figure 26:
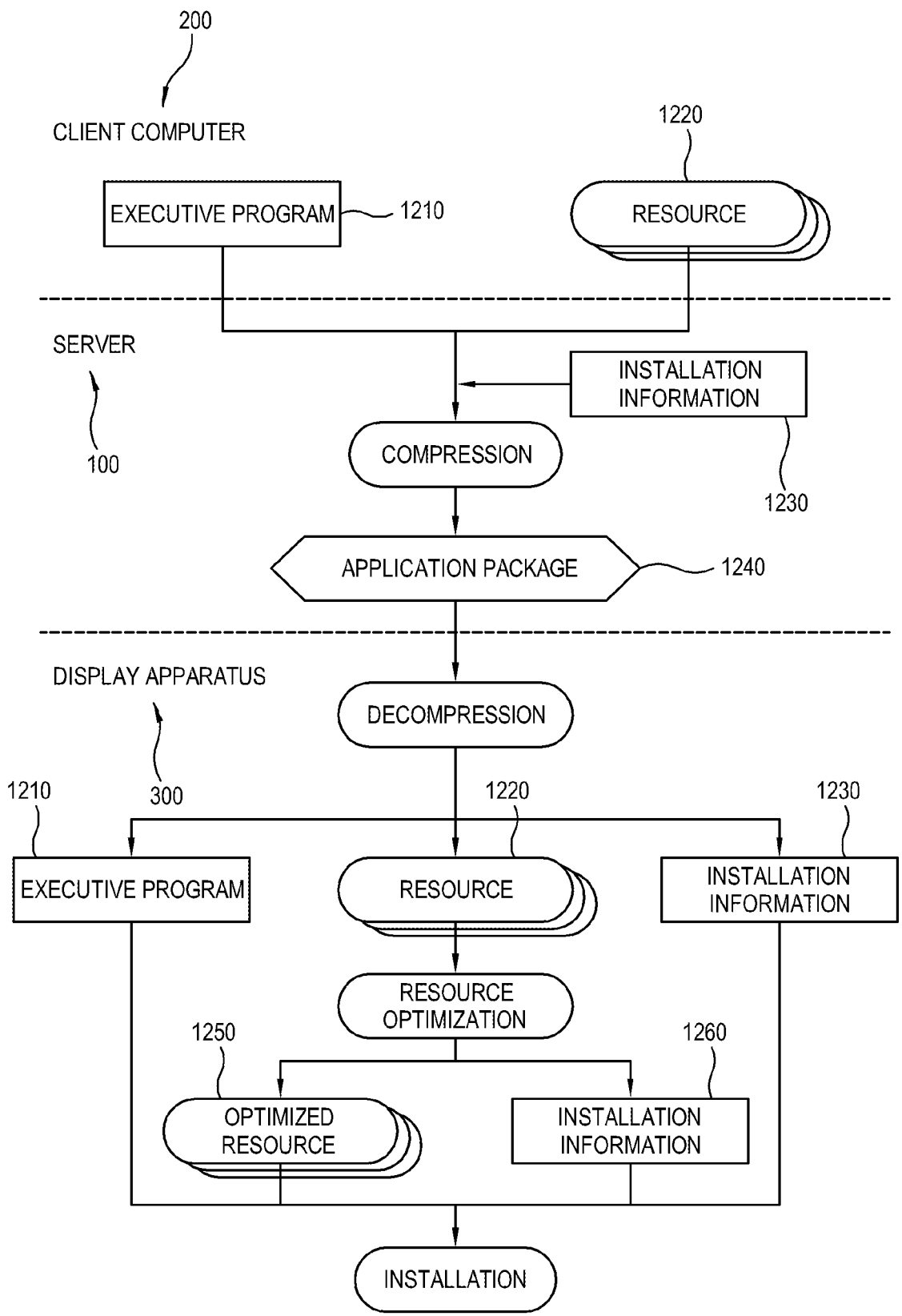
FIG. 26 is a diagram illustrating producing and installing an application package according to a sixth example embodiment.

FIG. 26 is a view of producing and installing an application package 1240 according to a sixth example embodiment.

As shown in FIG. 26, the client computer 200 according to the sixth example embodiment makes an executive program 1210 and one or more resources 1220 in order to produce an application. Here, the client computer 200 transmits the executive program 1210 and the resource 1220 to the server 100 as they are.

Then, the server 100 receives the executive program 1210 and the resource 1220 from the client computer 200, and compresses them together with the installation information 1230, thereby making the application package 1240. Here, the installation information 1230 may be created by the server 100, or may be created by the client computer 200 and then transmitted to the server 100. The server 100 transmits the application package 1240 to the display apparatus 300.

The display apparatus 300 decompresses the application package 1240 received from the server 100 into the executive program 1210, the resource 1220 and the installation information 1230. Here, the display apparatus 300 optimizes the resource 1220, and thus makes the optimized resource 1250 and the resource information 1260. The foregoing methods of optimizing the resource may be employed in this example embodiment, and thus repetitive descriptions thereof will be avoided as necessary.

The display apparatus 30 installs the executive program 1210, the optimized resource 1250, the installation information 1230 and the resource information 1260 on the operating system.

Like this, according to this example embodiment, the operation of packaging the application is implemented in the server 100, and the operation of optimizing the resource is performed in the display apparatus 300. Although the application package 1240 includes the resources 1220 not optimized therein, the resources 1220 are optimized when the application package 1240 is installed in the display apparatus 300, thereby having an effect on shortening the time to be taken in decoding when the application is executed.

Figure 27:
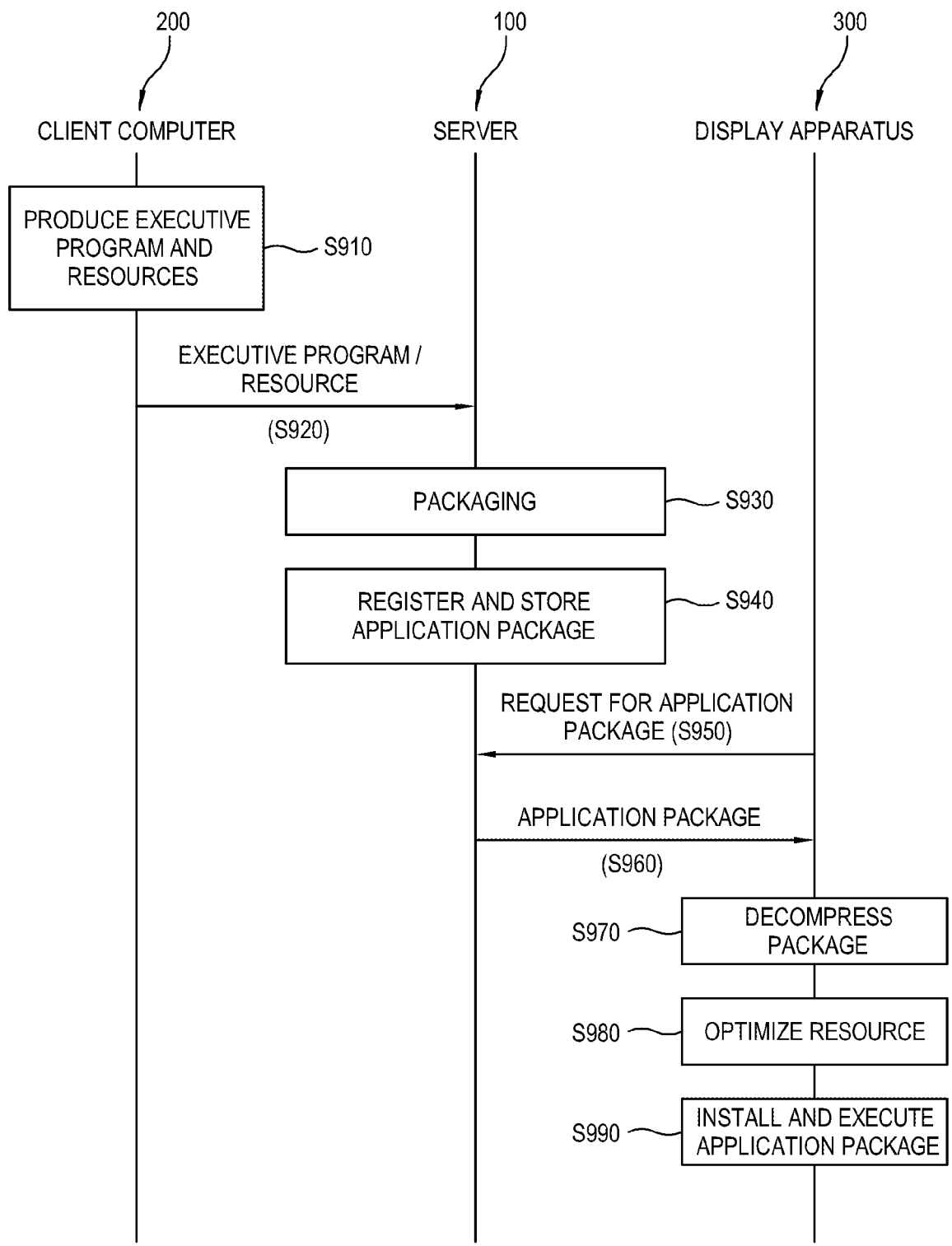
FIG. 27 is a flowchart illustrating producing and distributing an application in a system according to the sixth example embodiment.

FIG. 27 is a flowchart of producing and distributing an application in a system 1 according to the sixth example embodiment As shown in FIG. 27, at operation S910 the client computer 200 produces an executive program and resources for an application.

At operation S920 the client computer 200 sends the server 100 the executive program and the resources.

At operation S930 the server 100 packages the executive program, the resource and the installation information received from the client computer 200 all together to thereby create an application package.

At operation S940 the server 100 registers and stores the created application package.

At operation S950 the server 100 receives a request for the application package from the display apparatus 300. Thus, at operation S960 the server 100 transmits the application package corresponding to the request to the display apparatus 300.

At operation S970 the display apparatus 300 decompresses the application package received from the server 100 and restores the executive program, the resource and the installation information.

At operation S980 the display apparatus 300 optimizes the resource. The optimization of the resources is the same as described above. In result, the resources are optimized, and the resource information is created. In accordance with the methods of optimizing the resources, the resource information may not be created.

At operation S990 the display apparatus 300 installs the executive program and the optimized resource on the operating system in accordance with the installation information, and executes the application.

FIG. 28 is a flowchart of producing and distributing an application in a system 1 according to a seventh example embodiment.

As shown in FIG. 28, at operation S1110 the client computer 200 produces an executive program and resources for an application At operation S1120, the client computer 200 packages the executive program, the resource and the installation information all together to thereby create the application package.

At operation S1130 the client computer 200 sends the server 100 the application package.

At operation S1140 the server 100 registers and stores the application package received from the client computer 200.

At operation S1150 the server 100 receives a request for the application package from the display apparatus 300. Thus, at operation S1160 the server 100 transmits the application package corresponding to the request to the display apparatus 300.

At operation S1170 the display apparatus 300 decompresses the application package received from the server 100 and restores the executive program, the resource and the installation information.

At operation S1180 the display apparatus 300 optimizes the resources. The optimization of the resources is the same as described above. In result, the resources are optimized, and the resource information is created. In accordance with the methods of optimizing the resources, the resource information may not be created.

At operation S1190 the display apparatus 300 installs the executive program and the optimized resource on the operating system in accordance with the installation information, and executes the application.

Thus, according to an example embodiment, the client computer 200 performs the packaging operation, and the display apparatus 300 performs the resource optimization when the application is installed.

The methods according to the foregoing example embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for materializing the example embodiments. The program command recorded in this storage medium may be specially designed and configured according to the example embodiments, or may be publicly known and available to those skilled in the art of computer software.

Although a few example embodiments have been shown and described, it will be appreciated by those skilled in the art that changes may be made in these example embodiments without departing from the principles and spirit of the disclosure, the scope of which is defined in the appended claims and their equivalents.

What is claimed is:

1. An information processing apparatus comprising:
a storage;
a communicator, comprising communication circuitry, configured to communicate with an image processing apparatus; and
at least one processor configured to:
obtain an application program and a resource file from the storage, wherein the application program is to be installed and executed in the image processing apparatus,
identify a type of the resource file,
obtain information for optimization from the storage based on the identified type of the resource file,
identify attributes of a plurality of meta data included in the obtained resource file,
remove meta data having the identified attributes from the resource file, based on the obtained for optimization, and
generate an application package including the application program and the resource file of which meta data having the identified attributes is removed, and transmit the generated application package through the communicator to the image processing apparatus.

2. The information processing apparatus according to claim 1, wherein the storage is configured to store optimization information configured so that the data in the resource data respectively corresponding to plural types of resource data is designated to be deleted in accordance with attributes, and
the at least one processor is configured to determine the type of the first resource data, and to determine an attribute to be deleted corresponding to the determined type based on the optimization information.

3. The information processing apparatus according to claim 2, wherein the resource data comprises at least one of a video file, an audio file and a multimedia file, and the optimization information is designated to delete the data having an attribute of meta-data from the resource data.

4. The information processing apparatus according to claim 2, wherein the optimization information is designated to store resource history information in which some contents of the meta-data are to be deleted from the resource data is recorded, and
the at least one processor is configured to add the resource history information to the package program.

5. The information processing apparatus according to claim 4, wherein the optimization information is designated to convert a first format of the resource data into a preset second format more efficient in reducing the data size than the first format, and
the at least one processor is configured to determine a format of third resource data, to convert the third resource data into fourth resource data having the second format designated in the optimization information, and to record a history of the conversion in the resource history information to return the fourth resource data in response to an operation of making a request for the third resource data when the application is executed on a preset platform.

6. The information processing apparatus according to claim 4, wherein the at least one processor is configured to delete at least one piece of sixth resource data overlapped with fifth resource data from an entire resource data of the application, and to record a history of the deletion in the resource history information to return the sixth resource data in response to an operation of making a request for the fifth resource data when the application is executed on a preset platform.

7. The information processing apparatus according to claim 1, further comprising communication circuitry configured to communicate with the application execution apparatus, wherein
the at least one processor is configured to store the package program in the storage, and to send the package program to the application execution apparatus through the communicator configured to be installed in the application execution apparatus in request to a request from the application execution apparatus.

8. The information processing apparatus according to claim 1, wherein the application comprises a web application to be executed on a web browser program.

9. An image processing apparatus comprising:
a storage;
receiver circuitry configured to communicate with an information processing apparatus; and
at least one processor configured to;

receive an application package through the receiver circuitry, wherein the application package includes an application program and a resource file, wherein the application program is to be installed and executed in the image processing apparatus, identify a type of the resource file, obtain information for optimization based on the identified type of the resource file, identify attributes of a plurality of meta data included in the obtained resource file, remove meta data having the identified attributes from the resource file, based on the obtained information for optimization, and regenerate the application package including the application program and the resource file of which meta data having the identified attributes is removed, and install the regenerated application package in the storage.

10. A method of controlling an information processing apparatus, the method comprising:

acquiring a main program of an application to be installed in an application execution apparatus and first resource data comprising data corresponding to a plurality of attributes about execution of the main program;

creating second resource data excluding data corresponding to at least one attribute from the plurality of attributes of the first resource data, said at least one attribute being used less than another attribute of the plurality of attributes when the main program is executed, said second resource data having a smaller data size than the first resource data; and producing a package program comprising the main program and the created second resource data, but not including the excluded at least one attribute from the plurality of attributes of the first resource data about execution of the main program for the application, for installing the application.

11. The method according to claim 10, wherein the creating the second resource data comprises determining a type of the first resource data, and determining and deleting an attribute corresponding to the determined type based on optimization information, and the optimization information is designated to delete the data in the resource data respectively corresponding to plural types of resource data in accordance with attributes.

12. The method according to claim 11, wherein the resource data comprises at least one of a video file, an audio file and a multimedia file, and the optimization information is designated to delete the data having an attribute of meta-data from the resource data.

13. The method according to claim 11, wherein the optimization information causes storing of resource history information in which some contents of the meta-data to be deleted from the resource data is recorded, and the producing the package program for installing the application comprises adding the resource history information to the package program.

14. The method according to claim 13, wherein the optimization information is designated to convert a first format of the resource data into a preset second format more efficient in reducing the data size than the first format, and the creating the second resource data comprises:

determining a format of third resource data and converting the third resource data into fourth resource data having the second format designated in the optimization information; and recording a history of the conversion in the resource history information to return the fourth resource data in response to an operation of making a request for the third resource data when the application is executed on a preset platform.

15. The method according to claim 13, wherein the creating the second resource data comprises:

deleting at least one piece of sixth resource data overlapped with fifth resource data from the whole resource data of the application; and recording a history of the deletion in the resource history information to return the sixth resource data in response to an operation of making a request for the fifth resource data when the application is executed on a preset platform.

16. The method according to claim 10, further comprising: storing the package program, and sending the package program to the application execution apparatus through communication circuitry configured to be installed in the application execution apparatus in request to a request from the application execution apparatus.

17. The method according to claim 10, wherein the application comprises a web application configured to be executed on a web browser program.

18. A method of controlling an image processing apparatus, the method comprising:

receiving a package program for installing an application comprising a main program, and first resource data comprising data corresponding to a plurality of attributes about execution of the main program; and installing the application to be executable by decompressing the package program, the installing the application comprises:

creating second resource data excluding data corresponding to at least one attribute from the plurality of attributes of the first resource data, said at least one attribute to be used less than another attribute of the plurality of attributes upon execution of the main program, said second resource data having a smaller data size than the first resource data; and installing the application comprising the main program and the created second resource data but not the excluded data corresponding to the at least one attribute from the plurality of attributes of the first resource data.

* * * * *